United States Patent [19]
Okino et al.

[11] Patent Number: 5,682,437
[45] Date of Patent: Oct. 28, 1997

[54] METHOD OF CONVERTING TWO-DIMENSIONAL IMAGES INTO THREE-DIMENSIONAL IMAGES

[75] Inventors: Toshiyuki Okino, Kadoma; Toshiya Iinuma, Moriguchi; Shugo Yamashita, Osaka; Haruhiko Murata, Takatsuki; Seiji Okada, Moriguchi; Yukio Mori, Kadoma; Akihiro Maenaka, Moriguchi; Hidekazu Uchida; Susumu Tanase, both of Hirakata; Takashi Ikeda; Minoru Takahashi, both of Higashiosaka, all of Japan

[73] Assignee: Sanyo Electric Co., Ltd., Osaka, Japan

[21] Appl. No.: 600,034

[22] Filed: Feb. 12, 1996

Related U.S. Application Data

[63] Continuation of Ser. No. 530,467, Sep. 19, 1995, abandoned.

[30] Foreign Application Priority Data

| Sep. 22, 1994 | [JP] | Japan | 6-228134 |
| Sep. 22, 1994 | [JP] | Japan | 6-228135 |
| Mar. 17, 1995 | [JP] | Japan | 7-58612 |
| Apr. 11, 1995 | [JP] | Japan | 7-85714 |

[51] Int. Cl.$^6$ .................... G06K 9/00; H04N 13/00
[52] U.S. Cl. .................... 382/100; 382/154; 348/44
[58] Field of Search .................... 382/100, 103, 382/107, 154, 173, 276; 348/25, 44, 155, 169, 699; 395/119, 133, 173; H04N 13/00

[56] References Cited

U.S. PATENT DOCUMENTS

| H713 | 11/1989 | May et al. | 364/517 |
| 4,805,015 | 2/1989 | Copeland | 358/88 |
| 4,994,898 | 2/1991 | Ling et al. | 358/3 |
| 5,280,351 | 1/1994 | Wilkinson | 358/140 |
| 5,432,543 | 7/1995 | Hasegawa et al. | 348/45 |
| 5,510,832 | 4/1996 | Garcia | 348/56 |

FOREIGN PATENT DOCUMENTS

| 0 205 091 | 12/1986 | European Pat. Off. | H04N 7/137 |
| WO 88/04804 | 6/1988 | European Pat. Off. | |
| 2654291 | 5/1991 | France | H04N 13/00 |
| 5-91544 | 4/1993 | Japan | H04N 13/00 |
| WO 88/04804 | 6/1988 | WIPO | G06F 3/14 |

OTHER PUBLICATIONS

Patent Abstract of Japan, vol. 95, No. 003 & JP-A-07 059119 (Seiko Epson Co) 17 Dec. 1986, Mar. 3, 1995 abstract.

N. grammalidis et al., Stereo image sequence coding based on three-dimensional motion estimation and compensation, Signal Processing Image Communication, pp: 129-145, Jul. 1995.

T. Kanade, Development of a Video-Rate Stereo Machine, Proceedings of 94 ARPA Image Understanding Workshop, pp: 1-5, Nov, 14, 1994.

H. van der Elst et al., Modelling and restoring images distorted by atmospheric turbulence, IEEE 94, pp: 162-167, 1994.

*Primary Examiner*—Andrew Johns
*Attorney, Agent, or Firm*—Nikaido, Marmelstein, Murray & Oram LLP

[57] ABSTRACT

The present invention relates to a method of converting 2D images into 3D images by producing from a 2D image signal a main image signal and a sub-image signal delayed from the main image signal. In the present invention, a temporary field delay from the main image signal to the sub-image signal is found on the basis of data related to the movement in the current field of the main image signal (a first step). A target field delay is then found on the basis of the temporary field delay found in the first step (a second step). A true field delay used in the succeeding field is found on the basis of the target field delay found in the second step and the true field delay used in the current field (a third step).

17 Claims, 42 Drawing Sheets

FIG. 6

| d2-1 | d2-2 | d2-3 | Pd |
|------|------|------|----|
| 3 | 3 | 5 | 3 |
| 3 | 5 | 5 | 3 |
| 5 | 5 | 5 | 5 |
| ⋮ | ⋮ | ⋮ | ⋮ |

FIG. 7

| d2-1 | d2-2 | d2-3 | Pd |
|------|------|------|----|
| 3 | 3 | 4 | 3 |
| 3 | 4 | 5 | 3 |
| 4 | 5 | 6 | 3→4 |
| ⋮ | ⋮ | ⋮ | ⋮ |

FIG. 13

IMAGE SIGNAL OBTAINED BY TELECINE CONVERSION
USING 2-3 PULL-DOWN SYSTEM

| FRAME | 3 | | | 2 | | 3 | | 2 | | 3 | | | 2 | |
|---|---|---|---|---|---|---|---|---|---|---|---|---|---|---|
| INPUT | $A_1$ | $A_2$ | $A_3$ | $B_4$ | $B_5$ | $C_6$ | $C_7$ | $C_8$ | $D_9$ | $D_{10}$ | $E_{11}$ | $E_{12}$ | $E_{13}$ | $F_{14}$ | $F_{15}$ |
| | $G_{16}$ | $G_{17}$ | $G_{18}$ | $H_{19}$ | $H_{20}$ | $I_{21}$ | $I_{22}$ | $I_{23}$ | $J_{24}$ | $J_{25}$ | $K_{26}$ | $K_{27}$ | $K_{28}$ | $L_{29}$ | $L_{30}$ |
| | $M_{31}$ | $M_{32}$ | $M_{33}$ | $N_{34}$ | $N_{35}$ | $O_{36}$ | $O_{37}$ | $O_{38}$ | $P_{39}$ | $P_{40}$ | $Q_{41}$ | $Q_{42}$ | $Q_{43}$ | $R_{44}$ | $R_{45}$ |

FIG. 14

FRAME DELAY IS ONE(NORMAL FIELD DELAY($\pm 1 \sim \pm 3$))
COMPLETE DELAY MODE

| 6 | 5 | 4 | 3 | 2 | 1 | 0 |
|---|---|---|---|---|---|---|
| $A_2$ | $A_3$ | $B_4$ | $(B_5)$ | $C_6$ | $C_7$ | $C_8$ |
| $A_3$ | $B_4$ | $B_5$ | $C_6$ | $(C_7)$ | $C_8$ | $D_9$ |
| $B_4$ | $B_5$ | $C_6$ | $C_7$ | $(C_8)$ | $D_9$ | $D_{10}$ |
| $B_5$ | $C_6$ | $C_7$ | $C_8$ | $(D_9)$ | $D_{10}$ | $E_{11}$ |
| $C_6$ | $C_7$ | $C_8$ | $D_9$ | $(D_{10})$ | $E_{11}$ | $E_{12}$ |
| $C_7$ | $C_8$ | $D_9$ | $(D_{10})$ | $E_{11}$ | $E_{12}$ | $E_{13}$ |
| $C_8$ | $D_9$ | $D_{10}$ | $E_{11}$ | $(E_{12})$ | $E_{13}$ | $F_{14}$ |
| $D_9$ | $D_{10}$ | $E_{11}$ | $E_{12}$ | $(E_{13})$ | $F_{14}$ | $F_{15}$ |
| $D_{10}$ | $E_{11}$ | $E_{12}$ | $E_{13}$ | $(F_{14})$ | $F_{15}$ | $G_{16}$ |
| $E_{11}$ | $E_{12}$ | $E_{13}$ | $F_{14}$ | $(F_{15})$ | $G_{16}$ | $G_{17}$ |
| $E_{12}$ | $E_{13}$ | $F_{14}$ | $(F_{15})$ | $G_{16}$ | $G_{17}$ | $G_{18}$ |

FIG. 15

FRAME DELAY IS TWO(NORMAL FIELD DELAY($\pm 4 \sim \pm 6$))
COMPLETE DELAY MODE

| 6 | 5 | 4 | 3 | 2 | 1 | 0 |
|---|---|---|---|---|---|---|
| $A_2$ | $(A_3)$ | $B_4$ | $B_5$ | $C_6$ | $C_7$ | $C_8$ |
| $A_3$ | $B_4$ | $(B_5)$ | $C_6$ | $C_7$ | $C_8$ | $D_9$ |
| $B_4$ | $(B_5)$ | $C_6$ | $C_7$ | $C_8$ | $D_9$ | $D_{10}$ |
| $B_5$ | $C_6$ | $(C_7)$ | $C_8$ | $D_9$ | $D_{10}$ | $E_{11}$ |
| $C_6$ | $C_7$ | $(C_8)$ | $D_9$ | $D_{10}$ | $E_{11}$ | $E_{12}$ |
| $C_7$ | $(C_8)$ | $D_9$ | $D_{10}$ | $E_{11}$ | $E_{12}$ | $E_{13}$ |
| $C_8$ | $D_9$ | $(D_{10})$ | $E_{11}$ | $E_{12}$ | $E_{13}$ | $F_{14}$ |
| $D_9$ | $(D_{10})$ | $E_{11}$ | $E_{12}$ | $E_{13}$ | $F_{14}$ | $F_{15}$ |
| $D_{10}$ | $E_{11}$ | $(E_{12})$ | $E_{13}$ | $F_{14}$ | $F_{15}$ | $G_{16}$ |
| $E_{11}$ | $E_{12}$ | $(E_{13})$ | $F_{14}$ | $F_{15}$ | $G_{16}$ | $G_{17}$ |
| $E_{12}$ | $(E_{13})$ | $F_{14}$ | $F_{15}$ | $G_{16}$ | $G_{17}$ | $G_{18}$ |

FIG. 16

FRAME DELAY IS CHANGED FROM ONE TO TWO COMPLETE DELAY MODE

| 6 | 5 | 4 | 3 | 2 | 1 | 0 | FRAME DELAY |
|---|---|---|---|---|---|---|---|
| A2 | A3 | B4 | (B5) | C6 | C7 | C8 | 1 |
| A3 | B4 | B5 | C6 | (C7) | C8 | D9 | 1 |
| B4 | B5 | C6 | C7 | (C8) | D9 | D10 | 1 |
| B5 | C6 | C7 | (C8) | D9 | D10 | E11 | 2 |
| C6 | C7 | C8 | D9 | (D10) | E11 | E12 | 2 |
| C7 | C8 | D9 | (D10) | E11 | E12 | E13 | |
| C8 | D9 | (D10) | E11 | E12 | E13 | F14 | |
| D9 | D10 | (E11) | E12 | E13 | F14 | F15 | |
| D10 | E11 | (E12) | E13 | F14 | F15 | G16 | |
| E11 | E12 | (E13) | F14 | F15 | G16 | G17 | |
| E12 | E13 | (F14) | F15 | G16 | G17 | G18 | |
| E13 | F14 | (F15) | G16 | G17 | G18 | H19 | |
| F14 | (F15) | G16 | G17 | G18 | H19 | H20 | |
| F15 | G16 | (G17) | G18 | H19 | H20 | I21 | |
| G16 | G17 | (G18) | H19 | H20 | I21 | I22 | |
| G17 | (G18) | H19 | H20 | I21 | I22 | I23 | |
| G18 | H19 | (H20) | I21 | I22 | I23 | J24 | |

FIG. 17

FRAME DELAY IS CHANGED FROM TWO TO ONE COMPLETE DELAY MODE

| 6 | 5 | 4 | 3 | 2 | 1 | 0 | FRAME DELAY |
|---|---|---|---|---|---|---|---|
| $A_2$ | $(A_3)$ | $B_4$ | $B_5$ | $C_6$ | $C_7$ | $C_8$ | 2 |
| $A_3$ | $B_4$ | $(B_5)$ | $C_6$ | $C_7$ | $C_8$ | $D_9$ | 2 |
| $B_4$ | $(B_5)$ | $C_6$ | $C_7$ | $C_8$ | $D_9$ | $D_{10}$ | 2 |
| $B_5$ | $C_6$ | $(C_7)$ | $C_8$ | $D_9$ | $D_{10}$ | $E_{11}$ | 1 |
| $C_6$ | $C_7$ | $(C_8)$ | $D_9$ | $D_{10}$ | $E_{11}$ | $E_{12}$ | 1 |
| $C_7$ | $C_8$ | $D_9$ | $(D_{10})$ | $E_{11}$ | $E_{12}$ | $E_{13}$ | |
| $C_8$ | $D_9$ | $(D_{10})$ | $E_{11}$ | $E_{12}$ | $E_{13}$ | $F_{14}$ | |
| $D_9$ | $D_{10}$ | $E_{11}$ | $E_{12}$ | $(E_{13})$ | $F_{14}$ | $F_{15}$ | |
| $D_{10}$ | $E_{11}$ | $E_{12}$ | $(E_{13})$ | $F_{14}$ | $F_{15}$ | $G_{16}$ | |
| $E_{11}$ | $E_{12}$ | $E_{13}$ | $F_{14}$ | $(F_{15})$ | $G_{16}$ | $G_{17}$ | |
| $E_{12}$ | $E_{13}$ | $F_{14}$ | $(F_{15})$ | $G_{16}$ | $G_{17}$ | $G_{18}$ | |
| $E_{13}$ | $F_{14}$ | $F_{15}$ | $G_{16}$ | $(G_{17})$ | $G_{18}$ | $H_{19}$ | |
| $F_{14}$ | $F_{15}$ | $G_{16}$ | $G_{17}$ | $(G_{18})$ | $H_{19}$ | $H_{20}$ | |
| $F_{15}$ | $G_{16}$ | $G_{17}$ | $G_{18}$ | $(H_{19})$ | $H_{20}$ | $I_{21}$ | |
| $G_{16}$ | $G_{17}$ | $G_{18}$ | $H_{19}$ | $(H_{20})$ | $I_{21}$ | $I_{22}$ | |
| $G_{17}$ | $G_{18}$ | $H_{19}$ | $(H_{20})$ | $I_{21}$ | $I_{22}$ | $I_{23}$ | |
| $G_{18}$ | $H_{19}$ | $H_{20}$ | $I_{21}$ | $(I_{22})$ | $I_{23}$ | $J_{24}$ | |

FIG. 18

FRAME DELAY IS ONE(NORMAL FIELD DELAY($\pm 1 \sim \pm 3$))
COMPROMISE DELAY MODE

| 6 | 5 | 4 | 3 | 2 | 1 | 0 |
|---|---|---|---|---|---|---|
| A2 | A3 | (B4) | B5 | C6 | C7 | C8 |
| A3 | B4 | B5 | C6 | (C7) | C8 | D9 |
| B4 | B5 | C6 | C7 | (C8) | D9 | D10 |
| B5 | C6 | C7 | C8 | (D9) | D10 | E11 |
| C6 | C7 | C8 | D9 | (D10) | E11 | E12 |
| C7 | C8 | (D9) | D10 | E11 | E12 | E13 |
| C8 | D9 | D10 | E11 | (E12) | E13 | F14 |
| D9 | D10 | E11 | E12 | (E13) | F14 | F15 |
| D10 | E11 | E12 | E13 | (F14) | F15 | G16 |
| E11 | E12 | E13 | F14 | (F15) | G16 | G17 |
| E12 | E13 | (F14) | F15 | G16 | G17 | G18 |

FIG. 19

FRAME DELAY IS TWO(NORMAL FIELD DELAY($\pm 4 \sim \pm 6$))
COMPROMISE DELAY MODE

| 6 | 5 | 4 | 3 | 2 | 1 | 0 |
|---|---|---|---|---|---|---|
| (A2) | A3 | B4 | B5 | C6 | C7 | C8 |
| A3 | B4 | (B5) | C6 | C7 | C8 | D9 |
| (B4) | B5 | C6 | C7 | C8 | D9 | D10 |
| B5 | C6 | (C7) | C8 | D9 | D10 | E11 |
| C6 | C7 | (C8) | D9 | D10 | E11 | E12 |
| (C7) | C8 | D9 | D10 | E11 | E12 | E13 |
| C8 | D9 | (D10) | E11 | E12 | E13 | F14 |
| (D9) | D10 | E11 | E12 | E13 | F14 | F15 |
| D10 | E11 | (E12) | E13 | F14 | F15 | G16 |
| E11 | E12 | (E13) | F14 | F15 | G16 | G17 |
| (E12) | E13 | F14 | F15 | G16 | G17 | G18 |

FIG. 20

FRAME DELAY IS CHANGED FROM ONE TO TWO
COMPROMISE DELAY MODE

| 6 | 5 | 4 | 3 | 2 | 1 | 0 | FRAME DELAY |
|---|---|---|---|---|---|---|---|
| $A_2$ | $A_3$ | $(B_4)$ | $B_5$ | $C_6$ | $C_7$ | $C_8$ | 1 |
| $A_3$ | $B_4$ | $B_5$ | $C_6$ | $(C_7)$ | $C_8$ | $D_9$ | 1 |
| $B_4$ | $B_5$ | $C_6$ | $C_7$ | $(C_8)$ | $D_9$ | $D_{10}$ | 1 |
| $B_5$ | $C_6$ | $(C_7)$ | $C_8$ | $D_9$ | $D_{10}$ | $E_{11}$ | 2 |
| $C_6$ | $C_7$ | $C_8$ | $D_9$ | $(D_{10})$ | $E_{11}$ | $E_{12}$ | 2 |
| $C_7$ | $C_8$ | $D_9$ | $(D_{10})$ | $E_{11}$ | $E_{12}$ | $E_{13}$ | |
| $C_8$ | $D_9$ | $(D_{10})$ | $E_{11}$ | $E_{12}$ | $E_{13}$ | $F_{14}$ | |
| $D_9$ | $D_{10}$ | $(E_{11})$ | $E_{12}$ | $E_{13}$ | $F_{14}$ | $F_{15}$ | |
| $D_{10}$ | $E_{11}$ | $(E_{12})$ | $E_{13}$ | $F_{14}$ | $F_{15}$ | $G_{16}$ | |
| $E_{11}$ | $E_{12}$ | $(E_{13})$ | $F_{14}$ | $F_{15}$ | $G_{16}$ | $G_{17}$ | |
| $E_{12}$ | $E_{13}$ | $(F_{14})$ | $F_{15}$ | $G_{16}$ | $G_{17}$ | $G_{18}$ | |
| $E_{13}$ | $F_{14}$ | $(F_{15})$ | $G_{16}$ | $G_{17}$ | $G_{18}$ | $H_{19}$ | |
| $(F_{14})$ | $F_{15}$ | $G_{16}$ | $G_{17}$ | $G_{18}$ | $H_{19}$ | $H_{20}$ | |
| $F_{15}$ | $G_{16}$ | $(G_{17})$ | $G_{18}$ | $H_{19}$ | $H_{20}$ | $I_{21}$ | |
| $G_{16}$ | $G_{17}$ | $(G_{18})$ | $H_{19}$ | $H_{20}$ | $I_{21}$ | $I_{22}$ | |
| $(G_{17})$ | $G_{18}$ | $H_{19}$ | $H_{20}$ | $I_{21}$ | $I_{22}$ | $I_{23}$ | |
| $G_{18}$ | $H_{19}$ | $(H_{20})$ | $I_{21}$ | $I_{22}$ | $I_{23}$ | $J_{24}$ | |

FIG. 21

FRAME DELAY IS CHANGED FROM TWO TO ONE
COMPROMISE DELAY MODE

| 6 | 5 | 4 | 3 | 2 | 1 | 0 | FRAME DELAY |
|---|---|---|---|---|---|---|---|
| (A2) | A3 | B4 | B5 | C6 | C7 | C8 | 2 |
| A3 | B4 | (B5) | C6 | C7 | C8 | D9 | 2 |
| (B4) | B5 | C6 | C7 | C8 | D9 | D10 | 2 |
| B5 | C6 | (C7) | C8 | D9 | D10 | E11 | 1 |
| C6 | C7 | (C8) | D9 | D10 | E11 | E12 | 1 |
| C7 | C8 | (D9) | D10 | E11 | E12 | E13 | |
| C8 | D9 | (D10) | E11 | E12 | E13 | F14 | |
| D9 | D10 | E11 | E12 | (E13) | F14 | F15 | |
| D10 | E11 | E12 | (E13) | F14 | F15 | G16 | |
| E11 | E12 | E13 | F14 | (F15) | G16 | G17 | |
| E12 | E13 | (F14) | F15 | G16 | G17 | G18 | |
| E13 | F14 | F15 | G16 | (G17) | G18 | H19 | |
| F14 | F15 | G16 | G17 | (G18) | H19 | H20 | |
| F15 | G16 | G17 | G18 | (H19) | H20 | I21 | |
| G16 | G17 | G18 | H19 | (H20) | I21 | I22 | |
| G17 | G18 | (H19) | H20 | I21 | I22 | I23 | |
| G18 | H19 | H20 | I21 | (I22) | I23 | J24 | |

FIG. 22

IMAGE SIGNAL OBTAINED BY TELECINE CONVERSION USING 2-2 PULL-DOWN SYSTEM

| | 2 | | 2 | | 2 | | 2 | | 2 | | 2 | | 2 | |
|---|---|---|---|---|---|---|---|---|---|---|---|---|---|---|
| INPUT | $A_1$ | $A_2$ | $B_3$ | $B_4$ | $C_5$ | $C_6$ | $D_7$ | $D_8$ | $E_9$ | $E_{10}$ | $F_{11}$ | $F_{12}$ | $G_{13}$ | $G_{14}$ |
| | $H_{15}$ | $H_{16}$ | $I_{17}$ | $I_{18}$ | $J_{19}$ | $J_{20}$ | $K_{21}$ | $K_{22}$ | $L_{23}$ | $L_{24}$ | $M_{25}$ | $M_{26}$ | $N_{27}$ | $N_{28}$ |
| | $O_{29}$ | $O_{30}$ | $P_{31}$ | $P_{32}$ | $Q_{33}$ | $Q_{34}$ | $R_{35}$ | $R_{36}$ | $S_{37}$ | $S_{38}$ | $T_{39}$ | $T_{40}$ | $U_{41}$ | $U_{42}$ |
| | $V_{43}$ | $V_{44}$ | $W_{45}$ | | | | | | | | | | | |

FIG. 23

FRAME DELAY IS ONE(NORMAL FIELD DELAY(±1～±2))
COMPLETE DELAY MODE AND COMPROMISE DELAY MODE

| 6 | 5 | 4 | 3 | 2 | 1 | 0 |
|---|---|---|---|---|---|---|
| A1 | A2 | B3 | B4 | (C5) | C6 | D7 |
| A2 | B3 | B4 | C5 | (C6) | D7 | D8 |
| B3 | B4 | C5 | C6 | (D7) | D8 | E9 |
| B4 | C5 | C6 | D7 | (D8) | E9 | E10 |
| C5 | C6 | D7 | D8 | (E9) | E10 | F11 |
| C6 | D7 | D8 | E9 | (E10) | F11 | F12 |
| D7 | D8 | E9 | E10 | (F11) | F12 | G13 |
| D8 | E9 | E10 | F11 | (F12) | G13 | G14 |
| E9 | E10 | F11 | F12 | (G13) | G14 | H15 |

FIG. 24

FRAME DELAY IS TWO(NORMAL FIELD DELAY($\pm 3 \sim \pm 4$))
COMPLETE DELAY MODE AND COMPROMISE DELAY MODE

| 6 | 5 | 4 | 3 | 2 | 1 | 0 |
|---|---|---|---|---|---|---|
| A1 | A2 | (B3) | B4 | C5 | C6 | D7 |
| A2 | B3 | (B4) | C5 | C6 | D7 | D8 |
| B3 | B4 | (C5) | C6 | D7 | D8 | E9 |
| B4 | C5 | (C6) | D7 | D8 | E9 | E10 |
| C5 | C6 | (D7) | D8 | E9 | E10 | F11 |
| C6 | D7 | (D8) | E9 | E10 | F11 | F12 |
| D7 | D8 | (E9) | E10 | F11 | F12 | G13 |
| D8 | E9 | (E10) | F11 | F12 | G13 | G14 |
| E9 | E10 | (F11) | F12 | G13 | G14 | H15 |

FIG. 25

FRAME DELAY IS THREE(NORMAL FIELD DELAY(±5~ ±6))
COMPLETE DELAY MODE AND COMPROMISE DELAY MODE

| 6 | 5 | 4 | 3 | 2 | 1 | 0 |
|---|---|---|---|---|---|---|
| (A1) | A2 | B3 | B4 | C5 | C6 | D7 |
| (A2) | B3 | B4 | C5 | C6 | D7 | D8 |
| (B3) | B4 | C5 | C6 | D7 | D8 | E9 |
| (B4) | C5 | C6 | D7 | D8 | E9 | E10 |
| (C5) | C6 | D7 | D8 | E9 | E10 | F11 |
| (C6) | D7 | D8 | E9 | E10 | F11 | F12 |
| (D7) | D8 | E9 | E10 | F11 | F12 | G13 |
| (D8) | E9 | E10 | F11 | F12 | G13 | G14 |
| (E9) | E10 | F11 | F12 | G13 | G14 | H15 |

FIG. 26

FRAME DELAY IS CHANGED TO 0,1,2 AND 3 IN THIS ORDER
COMPLETE DELAY MODE

| 6 | 5 | 4 | 3 | 2 | 1 | 0 | FRAME DELAY |
|---|---|---|---|---|---|---|---|
| A1 | A2 | B3 | B4 | C5 | C6 | (D7) | 0 |
| A2 | B3 | B4 | C5 | C6 | D7 | (D8) | 0 |
| B3 | B4 | C5 | C6 | D7 | (D8) | E9 | 1 |
| B4 | C5 | C6 | D7 | D8 | E9 | (E10) | 1 |
| C5 | C6 | D7 | D8 | E9 | (E10) | F11 | 1 |
| C6 | D7 | D8 | E9 | (E10) | F11 | F12 | 1 |
| D7 | D8 | E9 | E10 | (F11) | F12 | G13 | 1 |
| D8 | E9 | E10 | F11 | (F12) | G13 | G14 | 1 |
| E9 | E10 | F11 | F12 | (G13) | G14 | H15 | 1 |
| E10 | F11 | F12 | G13 | (G14) | H15 | H16 | 1 |
| F11 | F12 | G13 | (G14) | H15 | H16 | I17 | 2 |
| F12 | G13 | G14 | H15 | (H16) | I17 | I18 | 2 |
| G13 | G14 | H15 | (H16) | I17 | I18 | J19 | 2 |
| G14 | H15 | (H16) | I17 | I18 | J19 | J20 | 2 |
| H15 | H16 | (I17) | I18 | J19 | J20 | K21 | 2 |
| H16 | I17 | (I18) | J19 | J20 | K21 | K22 | 2 |
| I17 | I18 | (J19) | J20 | K21 | K22 | L23 | 2 |
| I18 | J19 | (J20) | K21 | K22 | L23 | L24 | 2 |
| J19 | (J20) | K21 | K22 | L23 | L24 | M25 | 3 |
| J20 | K21 | (K22) | L23 | L24 | M25 | M26 | 3 |
| K21 | (K22) | L23 | L24 | M25 | M26 | N27 | 3 |
| (K22) | L23 | L24 | M25 | M26 | N27 | N28 | 3 |

FIG. 27

FRAME DELAY IS CHANGED TO 0,1,2 AND 3 IN THIS ORDER
COMPROMISE DELAY MODE

| 6 | 5 | 4 | 3 | 2 | 1 | 0 | FRAME DELAY |
|---|---|---|---|---|---|---|---|
| A1 | A2 | B3 | B4 | C5 | C6 | (D7) | 0 |
| A2 | B3 | B4 | C5 | C6 | D7 | (D8) | 0 |
| B3 | B4 | C5 | C6 | D7 | (D8) | E9 | 1 |
| B4 | C5 | C6 | D7 | D8 | E9 | (E10) | 1 |
| C5 | C6 | D7 | D8 | (E9) | E10 | F11 | 1 |
| C6 | D7 | D8 | E9 | (E10) | F11 | F12 | 1 |
| D7 | D8 | E9 | E10 | (F11) | F12 | G13 | 1 |
| D8 | E9 | E10 | F11 | (F12) | G13 | G14 | 1 |
| E9 | E10 | F11 | F12 | (G13) | G14 | H15 | 1 |
| E10 | F11 | F12 | G13 | (G14) | H15 | H16 | 1 |
| F11 | F12 | (G13) | G14 | H15 | H16 | I17 | 2 |
| F12 | G13 | G14 | H15 | (H16) | I17 | I18 | 2 |
| G13 | G14 | (H15) | H16 | I17 | I18 | J19 | 2 |
| G14 | H15 | (H16) | I17 | I18 | J19 | J20 | 2 |
| H15 | H16 | (I17) | I18 | J19 | J20 | K21 | 2 |
| H16 | I17 | (I18) | J19 | J20 | K21 | K22 | 2 |
| I17 | I18 | (J19) | J20 | K21 | K22 | L23 | 2 |
| I18 | J19 | (J20) | K21 | K22 | L23 | L24 | 2 |
| (J19) | J20 | K21 | K22 | L23 | L24 | M25 | 3 |
| J20 | K21 | (K22) | L23 | L24 | M25 | M26 | 3 |
| (K21) | K22 | L23 | L24 | M25 | M26 | N27 | 3 |
| (K22) | L23 | L24 | M25 | M26 | N27 | N28 | 3 |

FIG. 28

FRAME DELAY IS CHANGED TO 3,2,1 AND 0 IN THIS ORDER
COMPLETE DELAY MODE AND COMPROMISE DELAY MODE

| 6 | 5 | 4 | 3 | 2 | 1 | 0 | FRAME DELAY |
|---|---|---|---|---|---|---|---|
| (A1) | A2 | B3 | B4 | C5 | C6 | D7 | 3 |
| (A2) | B3 | B4 | C5 | C6 | D7 | D8 | 3 |
| (B3) | B4 | C5 | C6 | D7 | D8 | E9 | 2 |
| B4 | C5 | (C6) | D7 | D8 | E9 | E10 | 2 |
| C5 | C6 | (D7) | D8 | E9 | E10 | F11 | 2 |
| C6 | D7 | (D8) | E9 | E10 | F11 | F12 | 2 |
| D7 | D8 | (E9) | E10 | F11 | F12 | G13 | 2 |
| D8 | E9 | (E10) | F11 | F12 | G13 | G14 | 2 |
| E9 | E10 | (F11) | F12 | G13 | G14 | H15 | 2 |
| E10 | F11 | (F12) | G13 | G14 | H15 | H16 | 2 |
| F11 | F12 | (G13) | G14 | H15 | H16 | I17 | 1 |
| F12 | G13 | G14 | H15 | (H16) | I17 | I18 | 1 |
| G13 | G14 | H15 | H16 | (I17) | I18 | J19 | 1 |
| G14 | H15 | H16 | I17 | (I18) | J19 | J20 | 1 |
| H15 | H16 | I17 | I18 | (J19) | J20 | K21 | 1 |
| H16 | I17 | I18 | J19 | (J20) | K21 | K22 | 1 |
| I17 | I18 | J19 | J20 | (K21) | K22 | L23 | 1 |
| I18 | J19 | J20 | K21 | (K22) | L23 | L24 | 1 |
| J19 | J20 | K21 | K22 | (L23) | L24 | M25 | 0 |
| J20 | K21 | K22 | L23 | L24 | M25 | (M26) | 0 |
| K21 | K22 | L23 | L24 | M25 | M26 | (N27) | 0 |
| K22 | L23 | L24 | M25 | M26 | N27 | (N28) | 0 |

FIG. 30

| VOLUME | −4 (WEAK) | −3 | −2 | −1 | 0 (STANDARD) | 1 | 2 | 3 | 4 (STRONG) |
|---|---|---|---|---|---|---|---|---|---|
| AMOUNT OF PARALLAX $P = D \cdot V$ (PIXEL) | 4 | 6 | 8 | 10 | 12 | 14 | 16 | 18 | 20 |
| AMOUNT OF PHASE SHIFT (PIXEL) | 2 | 2 | 3 | 3 | 4 | 4 | 5 | 5 | 6 |

//  # METHOD OF CONVERTING TWO-DIMENSIONAL IMAGES INTO THREE-DIMENSIONAL IMAGES

This application is a continuation of application Ser. No. 08/530,467 filed Sep. 19, 1995 now abandoned.

BACKGROUND OF THE INVENTION

1. Field of the Invention

The present invention relates to a method of converting two-dimensional (2D) images outputted from a VTR (Video Tape Recorder), a video camera or the like and transmitted by a CATV (Cable Television), TV broadcasting or the like into three-dimensional (3D) images.

2. Description of the Prior Art

Almost all types of 3D image software used for a 3D image display system which has been recently in the news are particularly produced for the 3D image display system. The 3D image software is generally produced by picking up a right eye image and a left eye image using two cameras and recording the images. The left eye image and the right eye image which are recorded on the 3D image software are overlapped and displayed on a display device almost simultaneously. The left eye image and the right eye image which are overlapped and displayed are respectively incident on the left eye and the right eye of a viewer, whereby the viewer recognizes 3D images.

A lot of types of 2D image software currently exist. If a 3D image can be produced from the 2D image software, therefore, time and labor required to produce 3D image software having the same content as that of the existing 2D image software again from the beginning are saved.

As a result, a method of converting 2D images into 3D images has already been proposed. Examples of the method of converting 2D images into 3D images include the following. Specifically, in the case of a 2D image on which an object moving from the left to the right is reflected, the original 2D image is taken as a left eye image, and an image corresponding to a field which is several fields preceding a field corresponding to the left eye image is taken as a right eye image. Consequently, parallax occurs between the left eye image and the right eye image. Therefore, both the images are displayed on a screen almost simultaneously so that the moving object is raised forward against a background.

The image corresponding to the field which is several fields preceding the field corresponding to the left eye image is obtained by storing the original 2D image in a field memory, delaying the image by a predetermined number of fields and reading out the image. The above described conventional method is referred to as a field delay system.

In the above described conventional method, when the number of fields from a field corresponding to one of the left eye image and the right eye image to a field corresponding to the other image (hereinafter referred to as a field delay) is made constant, the faster the movement of the moving object is, the larger the parallax becomes, whereby a 3D effect is changed so that a 3D image is difficult to see.

SUMMARY OF THE INVENTION

An object of the present invention is to provide a method of converting 2D images into 3D images in which a stable 3D effect is obtained and the movement of a moving object is smoothed.

Another object of the present invention is to provide a method of converting 2D images into 3D images in which a stable 3D effect is obtained and the movement of a moving object is smoothed, and a field delay can be adjusted depending on the taste of a viewer, the type of monitor used, the conditions under which the monitor is seen, and the like.

In a first method of converting 2D images into 3D images according to the present invention, a temporary field delay indicating the number of fields from a field corresponding to a main image signal to a field corresponding to a sub-image signal is found on the basis of data related to the movement in the current field of the main image signal (a first step). A target field delay is then found on the basis of the temporary field delay found in the first step (a second step). A true field delay used in the succeeding field is found on the basis of the target field delay found in the second step and a true field delay used in the current field (a third step).

In the first method of converting 2D images into 3D images according to the present invention, a method of converting 2D images into 3D images in which a stable 3D effect is obtained and the movement of a moving object is smoothed is realized.

In the first step, the temporary field delay is found on the basis of a table previously storing the relationship of a temporary field delay to data related to the movement of an image, for example.

Alternatively, in the first step, the temporary field delay is found on the basis of a relational expression for finding a temporary field delay from data related to the movement of an image.

In the second step, the temporary field delay found in the first step is taken as the target field delay, for example. Alternatively, in the second step, the target field delay is found on the basis of the temporary field delay found in the first step and past hysteresis data.

Examples in which the target field delay is found on the basis of the temporary field delay found in the first step and the past hysteresis data include the following.

(i) An average value of temporary field delays in a predetermined number of fields preceding the current field including the temporary field delay found in the first step is found, and is taken as the target field delay.

(ii) An average value of temporary field delays in a predetermined number of fields preceding the current field including the temporary field delay found in the first step is found, one or a plurality of average values of temporary field delays in a predetermined number of fields preceding a field which is one or more fields preceding the current field are found, and the target field delay is found on the basis of patterns of a combination of the found average values.

(iii) In the second step, an average value of temporary field delays in a predetermined number of fields preceding the current field and one or a plurality of average values of temporary field delays in a predetermined number of fields preceding a field which is one or more fields preceding the current field are first found, and the target field delay is then found on the basis of the respective average values.

(iv) In the second step, an average value of temporary field delays in a predetermined number of fields preceding the current field and one or a plurality of average values of temporary field delays in a predetermined number of fields preceding a field which is one or more fields preceding the current field are first found, an optimum average value in the current field is then selected from the average values, and the target field delay is then found on the basis of patterns of a combination of the optimum average value selected in the current field and one or a plurality of optimum average values selected in fields preceding the current field.

In the third step, the following processing, for example, is performed. Specifically, in a case where the target field delay found in the second step and the true field delay used in the current field coincide with each other, the true field delay used in the succeeding field is made equal to the true field delay used in the current field.

Also in a case where the target field delay found in the second step and the true field delay used in the current field do not coincide with each other, and the true field delay used in the current field is not continuing for a predetermined number of fields, the true field delay used in the succeeding field is made equal to the true field delay used in the current field.

In a case where the target field delay found in the second step and the true field delay used in the current field do not coincide with each other and the true field delay used in the current field is continuing for a predetermined number of fields, the true field delay used in the succeeding field is set to a value closer to the target field delay by a predetermined value than the true field delay used in the current field.

In the third step, the following processing, for example, is performed. Specifically, in a case where the plus or minus sign of the target field delay found in the second step differs from the plus or minus sign of the true field delay used in the current field, the true field delay used in the succeeding field is so determined that the true field delay used in the current field quickly approaches the target field delay.

Also in a case where the plus or minus sign of the target field delay found in the second step is the same as the plus or minus sign of the true field delay used in the current field and the absolute value of the target field delay is smaller than the absolute value of the true field delay used in the current field, the true field delay used in the succeeding field is so determined that the true field delay used in the current field quickly approaches the target field delay.

In a case where the plus or minus sign of the target field delay found in the second step is the same as the plus or minus sign of the true field delay used in the current field and the absolute value of the target field delay is larger than the absolute value of the true field delay used in the current field, the true field delay used in the succeeding field is so determined that the true field delay used in the current field slowly approaches the target field delay.

In the third step, the following processing, for example, is performed. Specifically, it is judged whether or not the target field delay found in the second step and the true field delay used in the current field coincide with each other (a fourth step).

When it is judged in the fourth step that the target field delay found in the second step and the true field delay used in the current field do not coincide with each other, it is judged whether or not the plus or minus sign of the target field delay found in the second step and the plus or minus sign of the true field delay used in the current field coincide with each other (in a fifth step).

When it is judged in the fifth step that the plus or minus sign of the target field delay found in the second step and the plus or minus sign of the true field delay used in the current field coincide with each other, it is judged whether or not the absolute value of the target field delay found in the second step is larger than the absolute value of the true field delay used in the current field (in a sixth step).

When it is judged in the sixth step that the absolute value of the target field delay found in the second step is larger than the absolute value of the true field delay used in the current field, it is judged whether or not the true field delay used in the current field is continuing for a first predetermined number of fields (in a seventh step).

When it is judged in the fifth step that the plus or minus sign of the target field delay found in the second step and the plus or minus sign of the true field delay used in the current field do not coincide with each other, it is judged whether or not the true field delay used in the current field is continuing for a second predetermined number of fields smaller than the first predetermined number of fields (in an eighth step).

When it is judged in the sixth step that the absolute value of the target field delay found in the second step is smaller than the absolute value of the true field delay used in the current field, it is judged whether or not the true field delay used in the current field is continuing for a third predetermined number of fields smaller than the first predetermined number of fields (in a ninth step).

When it is judged in the fourth step that the target field delay found in the second step and the true field delay used in the current field coincide with each other, when it is judged in the seventh step that the true field delay used in the current field is not continuing for a first predetermined number of fields, when it is judged in the eighth step that the true field delay used in the current field is not continuing for a second predetermined number of fields, or when it is judged in the ninth step that the true field delay used in the current field is not continuing for a third predetermined number of fields, the true field delay used in the succeeding field is made equal to the true field delay used in the current field (in a tenth step).

When it is judged in the seventh step that the true field delay used in the current field is continuing for a first predetermined number of fields, when it is judged in the eighth step that the true field delay used in the current field is continuing for a second predetermined number of fields, or when it is judged in the ninth step that the true field delay used in the current field is continuing for a third predetermined number of fields, the true field delay used in the succeeding field is set to a value closer to the target field delay by a predetermined value than the true field delay used in the current field (an eleventh step).

In a second method of converting 2D images into 3D images according to the present invention, a field delay from a main image signal to a sub-image signal in the succeeding field is found on the basis of data related to the movement in the current field of the main image signal. The amount and the direction of phase shift of one or both of the main image signal and the sub-image signal are so determined that an amount of the change between a field delay in the current field and the field delay in the succeeding field is substantially reduced.

In the second method of converting 2D images into 3D images according to the present invention, a method of converting 2D images into 3D images in which a stable 3D effect is obtained and the movement of a moving object is smoothed is realized.

In a third method of converting 2D images into 3D images according to the present invention, a plurality of types of tables representing the relationship between the speed of the movement of an image and a field delay are previously stored. In addition, there is provided inputting means for designating a predetermined table out of the plurality of types of tables. The speed of the movement of a main image signal is calculated for each field. A field delay is found on the basis of the table designated by the inputting means and the speed of the movement in the current field of the main image signal. A field delay from the main image signal to a sub-image signal in the succeeding field is determined on the basis of the found field delay.

In a fourth method of converting 2D images into 3D images, a plurality of types of tables representing the relationship between the speed of the movement of an image and a field delay and an amount of phase shift predetermined for each table are previously stored. In addition, there is provided single inputting means for designating a predetermined table out of the plurality of types of tables and at the same time, designating an amount of phase shift corresponding thereto.

The speed of the movement of a main image signal is calculated for each field. A field delay is found on the basis of the table designated by the inputting means and the speed of the movement in the current field of the main image signal. A field delay from the main image signal to a sub-image signal in the succeeding field is determined on the basis of the found field delay. The main image signal and the sub-image signal delayed by the determined field delay from the main image signal are subjected to phase shift in the succeeding field depending on the amount of phase shift designated by the inputting means.

In a fifth method of converting 2D images into 3D images according to the present invention, a relational expression for finding a field delay is previously produced on the basis of 3D effect adjusting data and the speed of the movement of an image. In addition, there is provided inputting means for inputting the 3D effect adjusting data. The speed of the movement of a main image signal is calculated for each field. A field delay is found on the basis of the adjusting data inputted by the inputting means, the speed of the movement in the current field of the main image signal, and the relational expression previously produced. A field delay from the main image signal to a sub-image signal in the succeeding field is determined on the basis of the found field delay.

In a sixth method of converting 2D images into 3D images according to the present invention, a table representing the relationship between the speed of the movement of an image and a field delay is previously stored. In addition, there is provided inputting means for inputting field delay scale factor data. The speed of the movement of a main image signal is calculated for each field. A field delay is found on the basis of the speed of the movement in the current field of the main image signal and the table. The found field delay is multiplexed by the field delay scale factor data inputted by the inputting means. A field delay from the main image signal to a sub-image signal in the succeeding field is determined on the basis of a value obtained by the multiplication.

In the third to sixth methods of converting 2D images into 3D images according to the present invention, a method of converting 2D images into 3D images in which a stable 3D effect is obtained and the movement of a moving object is smoothed, and a field delay can be adjusted depending on the taste of a viewer, the type of monitor used, the conditions under which the monitor is seen, and the like.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a flow chart showing the detailed procedure for field delay calculating processing in the step 6 shown in FIG. 2a;

FIG. 6 is a timing chart showing how a target field delay is changed when all three second field delays coincide;

FIG. 7 is a timing chart showing how a target field delay is changed when all three second field delays are larger than a target field delay;

FIG. 13 is a typical diagram showing an image obtained by telecine conversion using a 2-3 pull-down system for each field;

FIG. 14 is a typical diagram showing delayed images actually outputted when a field delay at the normal time is 1 to 3 (−1 to −3) in a case where an input signal is a signal shown in FIG. 13 and a complete delay mode is set;

FIG. 15 is a typical diagram showing delayed images actually outputted when a field delay at the normal time is 4 to 6 (−4 to −6) in a case where an input signal is a signal shown in FIG. 13 and a complete delay mode is set;

FIG. 16 is a typical diagram showing delayed images actually outputted when a frame delay is changed from one to two in a case where an input signal is a signal shown in FIG. 13 and a complete delay mode is set;

FIG. 17 is a typical diagram showing delayed images actually outputted when a frame delay is changed from two to one in a case where an input signal is a signal shown in FIG. 13 and a complete delay mode is set;

FIG. 18 is a typical diagram showing delayed images actually outputted when a field delay at the normal time is 1 to 3 (−1 to −3) in a case where an input signal is a signal shown in FIG. 13 and a compromise delay mode is set;

FIG. 19 is a typical diagram showing delayed images actually outputted when a field delay at the normal time is 4 to 6 (−4 to −6) in a case where an input signal is a signal shown in FIG. 13 and a compromise delay mode is set;

FIG. 20 is a typical diagram showing delayed images actually outputted when a frame delay is changed from one to two in a case where an input signal is a signal shown in FIG. 13 and a compromise delay mode is set;

FIG. 21 is a typical diagram showing delayed images actually outputted when a frame delay is changed from two to one in a case where an input signal is a signal shown in FIG. 13 and a compromise delay mode is set;

FIG. 22 is a typical diagram showing an image obtained by telecine conversion using a 2—2 pull-down system for each field;

FIG. 23 is a typical diagram showing delayed images actually outputted when a field delay at the normal time is 1 to 2 (−1 to −2) in a case where an input signal is a signal shown in FIG. 22;

FIG. 24 is a typical diagram showing delayed images actually outputted when a field delay at the normal time is 3 to 4 (−3 to −4) in a case where an input signal is a signal shown in FIG. 22 and a complete delay mode is set;

FIG. 25 is a typical diagram showing delayed images actually outputted when a field delay at the normal time is 5 to 6 (−5 to −6) in a case where an input signal is a signal shown in FIG. 22 and a complete delay mode is set;

FIG. 26 is a typical diagram showing delayed images actually outputted when a frame delay is changed to 0, 1, 2 and 3 in this order in a case where an input signal is a signal shown in FIG. 22 and a complete delay mode is set;

FIG. 27 is a typical diagram showing delayed images actually outputted when a frame delay is changed to 0, 1, 2 and 3 in this order in a case where an input signal is a signal shown in FIG. 22 and a compromise delay mode is set;

FIG. 28 is a typical diagram showing delayed images actually outputted when a frame delay is changed to 3, 2, 1 and 0 in this order in a case where an input signal is a signal shown in FIG. 22;

FIG. 30 is a diagram showing the relationship of a field delay and an amount of phase shift which correspond to a volume set by a 3D effect adjuster;

DETAILED DESCRIPTION OF THE PREFERRED EMBODIMENTS

Description is now made of embodiments of the present invention with reference to the drawings.

Figure 1:
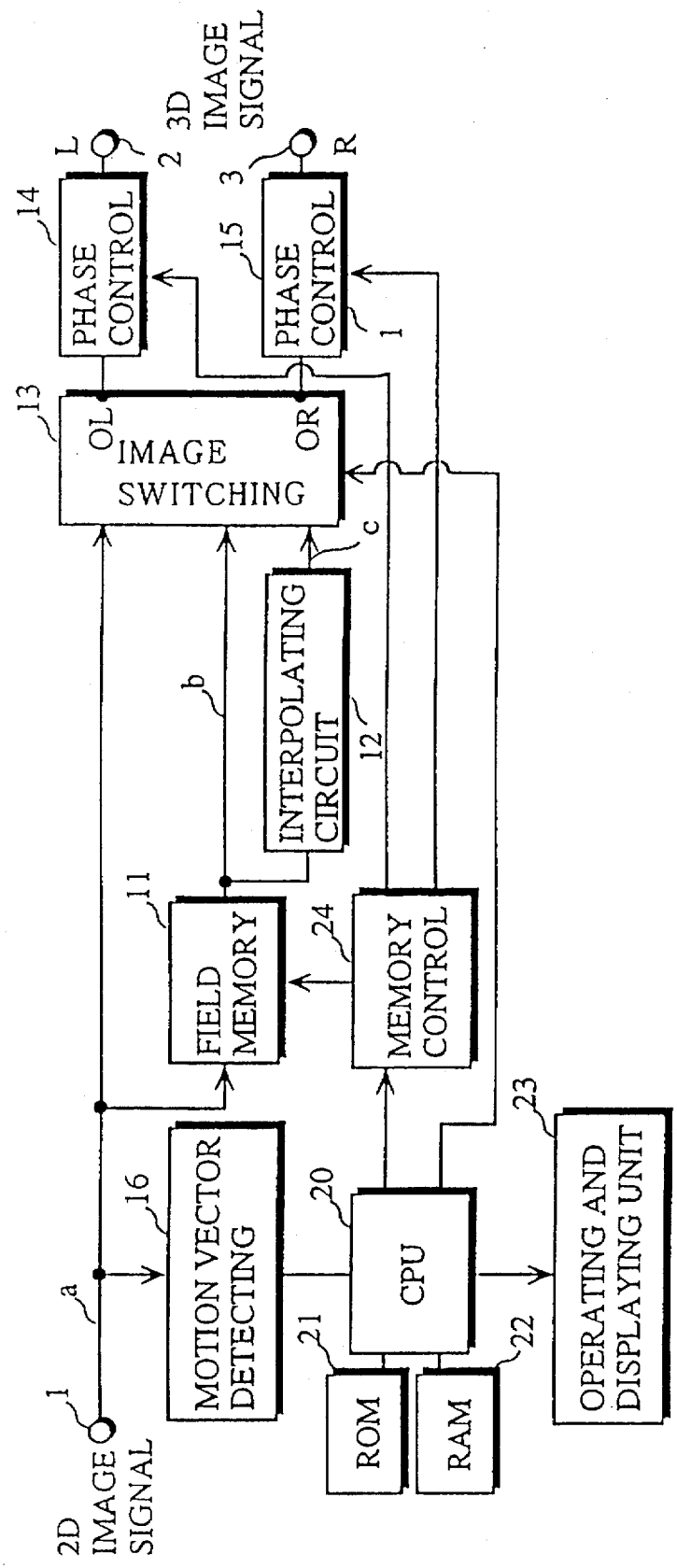
FIG. 1 is a block diagram showing the construction of a 2D/3D converter.

FIG. 1 illustrates the construction of a 2D/3D converter for converting 2D images into 3D images.

The 2D/3D converter produces a left eye image and a right eye image by a field delay system to produce parallax, and subjects both or one of the left eye image and the right eye image produced to phase shift, thereby to change the positional relationship between a subject and the surface of a reference screen.

A 2D image signal a is inputted to an input terminal 1. The 2D image signal a is sent to a motion vector detecting circuit 16, a plurality of field memories 11, and an image switching circuit 13.

As is well known, the motion vector detecting circuit 16 produces data for detecting a motion vector on the basis of a representative point matching method. The data produced by the motion vector detecting circuit 16 is sent to a CPU (Central Processing Unit) 20.

The representative point matching method will be briefly described. A plurality of motion vector detecting areas are set in an image area of each of fields, and each of the motion vector detecting areas is divided into a plurality of small areas. A plurality of sampling points and one representative point are set in each of the small areas.

The difference between the level of an image signal at a sampling point in each of the small areas in the current field and the level of an image signal at a representative point in a corresponding small area in the preceding field (a correlation value at each of the sampling points) is found for each motion vector detecting area. Correlation values at the sampling points which are the same in displacement from the representative points are accumulated between the small areas in each of the motion vector detecting areas. In each of the motion vector detecting areas, displacement of a point at which the minimum accumulated correlation value is obtained, that is, displacement of a point at which the correlation characteristics is the highest is extracted as a motion vector in the motion vector detecting area (the movement of a subject).

The field memory 11 is provided in order to delay the 2D image signal a for each field and output the delayed 2D image signal. A field delay (the number of fields from a field corresponding to an inputted 2D image signal to a field corresponding to a 2D image signal delayed by the field memory 11) is variably controlled for each field in the range of 0 to a maximum of 4 fields by a memory control circuit 24.

An output b of the field memory 11 (a delayed 2D image signal), is sent to an image switching circuit 13 and an interpolating circuit 12. The interpolating circuit 12 generates a vertical interpolation signal with respect to the input signal b. An output c of the interpolating circuit 12 (a vertical interpolation signal of the delayed 2D image signal) is sent to the image switching circuit 13.

Consequently, the inputted 2D image signal a, the delayed 2D image signal b, and the vertical interpolation signal c of the delayed 2D image signal b are inputted to the image switching circuit 13. The image switching circuit 13 switches one of the signal b and the signal c (a sub-image signal) and the signal a (a main image signal) depending on the direction of the movement of the subject and outputs the signals to a left image phase control circuit 14 and a right image phase control circuit 15. When the field delay is zero, the signal a is sent to both the left image phase control circuit 14 and the right image phase control circuit 15.

One of the signal b and the signal s is selected in the following manner. That is, the signal, which corresponds to the type of field (an odd field or an even field) corresponding to the 2D image signal a, out of the signal b and the signal c is selected. More specifically, if the field corresponding to the 2D image signal a and the field corresponding to the signal b are of the same type (an odd field or an even field), the signal b is selected. On the other hand, if the field corresponding to the 2D image signal a and the field corresponding to the signal b differ, the signal c is selected. The switching of the image by the image switching circuit 13 is controlled by the CPU 20.

Each of the phase control circuits 14 and 15 is provided to horizontally move the position where an inputted image is displayed by shifting the phase of the inputted image signal. The amount and the direction of phase shift are controlled by the memory control circuit 24. An output of the left image phase control circuit 14 is sent to a left image output terminal 2. On the other hand, an output of the right image phase control circuit 15 is sent to a right image output terminal 3.

The CPU 20 controls the memory control circuit 24 and the image switching circuit 13. The CPU 20 comprises a ROM (Read-Only Memory) 21 for storing its program and the like and a RAM (Random Access Memory) 22 for storing necessary data. Data required to detect a motion vector is sent from the motion vector detecting circuit 16 to the CPU 20. In addition, an operating and displaying unit 23 comprising various types of inputting means and display devices is connected to the CPU 20.

The CPU 20 calculates the field delay on the basis of the motion vector. In principle, the field delay is so determined that it is smaller when the motion vector is large, while being larger when the motion vector is small.

Furthermore, the CPU 20 controls the image switching circuit 13 on the basis of the direction of the motion vector. Specifically, when the motion vector is directed from the left to the right, the inputted 2D image signal a and the delayed 2D image signal b or c are respectively sent to the left image phase control circuit 14 and the right eye phase control circuit 15. When the motion vector is directed from the right to the left, the inputted 2D image signal a and the delayed 2D image signal b or c are respectively sent to the right image phase control circuit 15 and the left image phase control circuit 14.

In the 2D/3D converter, the left eye image and the right eye image are produced to produce parallax by a field delay system, and both or one of the left eye image and the right eye image produced are subjected to phase shift, thereby to change the positional relationship between the subject and the surface of the reference screen.

Figure 2A:
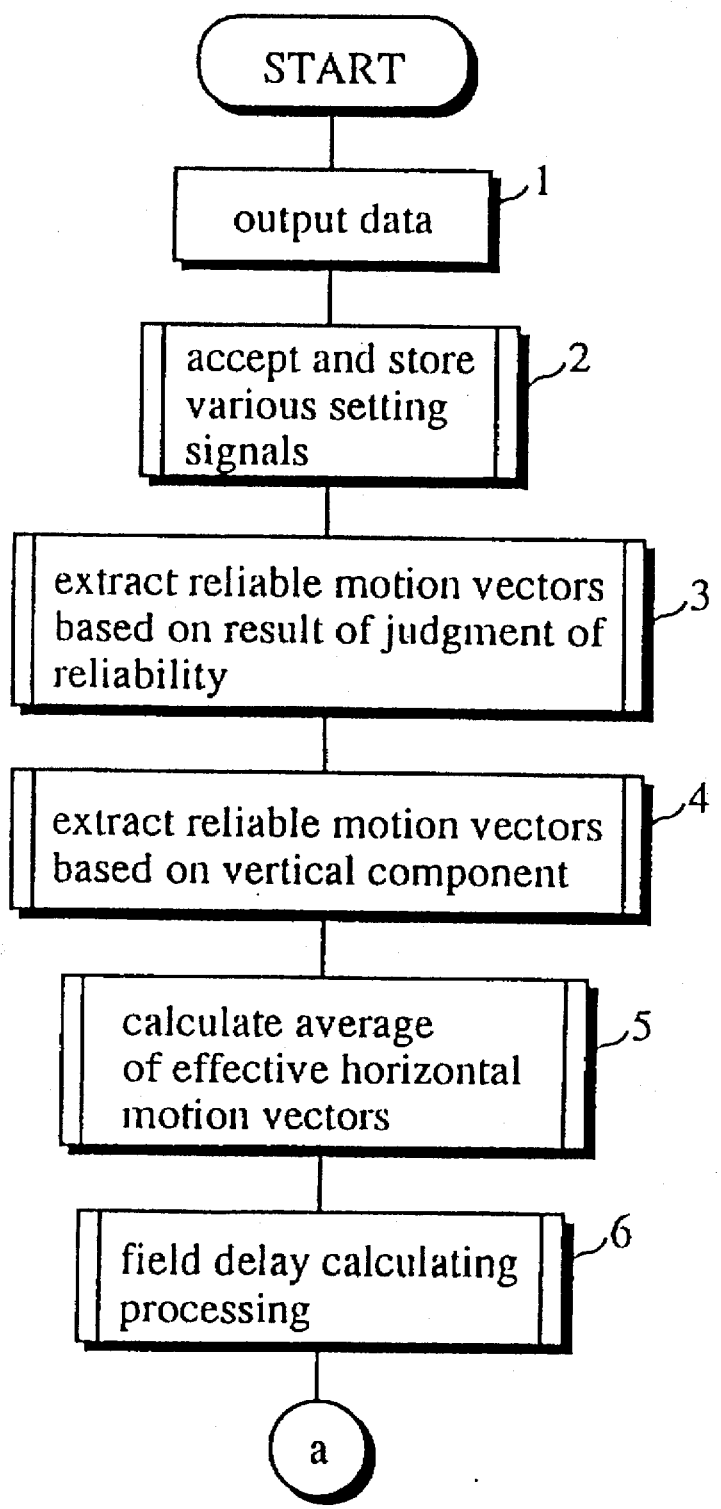
FIGS. 2a and 2b are flow charts showing the entire procedure for 2D/3D converting processing by a CPU.
Figure 2B:
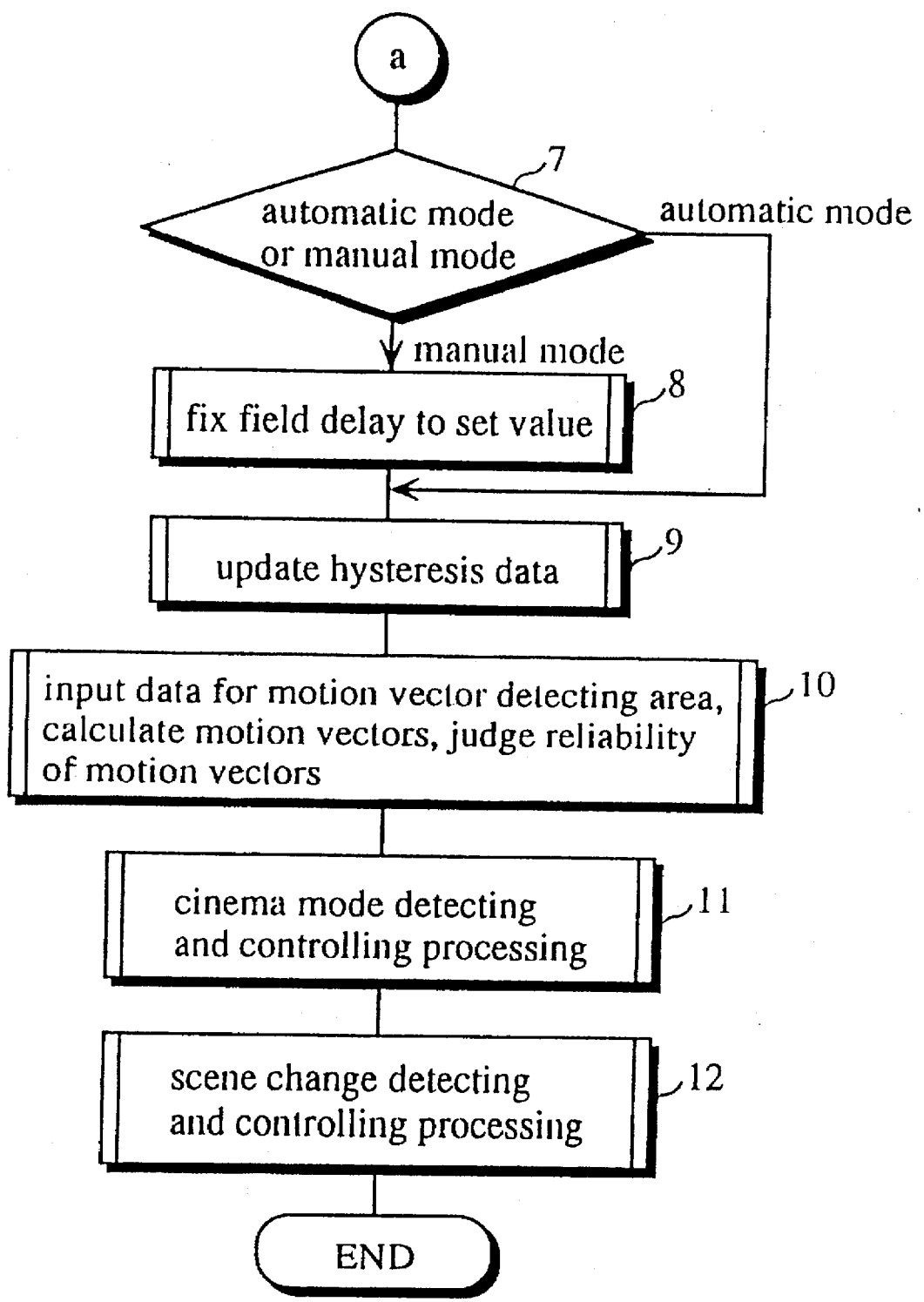

FIGS. 2a and 2b show the procedure for 2D/3D converting processing by the CPU.

2D/3D converting processing by the CPU is performed for each timing of switching of the field corresponding to the input image signal a.

(1) In the step 1, data respectively representing a memory to which a 2D image signal corresponding to the current field is to be written (a write memory) and a memory from which a 2D image signal already stored is to be read out (a read memory) out of the plurality of field memories 11 are outputted to the memory control circuit 24. In addition, data representing the amount and the direction of phase shift by each of the phase control circuits 14 and 15 are outputted to the memory control circuit 24. Further, an image switching control signal is outputted to the image switching circuit 13.

The read memory is determined on the basis of a field delay determined in the previous 2D/3D converting processing. In addition, the amount and the direction of phase shift by each of the phase control circuits 14 and 15 are determined on the basis of data already accepted and stored in the step 2 of the 2D/3D converting processing.

Furthermore, the selection of one of the delayed 2D image signals b and c is determined on the basis of the type of field corresponding to the 2D image signal b to be read out from the field memory 11 and the type of field corresponding to the 2D image signal a. Further, the switching between the selected signal b or c and the signal a is determined on the basis of the direction of a motion vector in the horizontal direction found by the previous 2D/3D converting processing. The direction of the switching between the selected signal b or c and the signal a is represented by the plus or minus sign of the field delay.

(2) In the step 2, various input signals from the operating and displaying unit 23 are accepted and stored. Examples of the various input signals include a signal for setting the amount and the direction of phase shift, an automatic/manual mode setting signal indicating which of an automatic mode and a manual mode is set to calculate a field delay, a field delay scale factor setting signal set in a case where the automatic mode is set, and a field delay setting signal set in a case where the manual mode is set.

(3) In the step 3, only reliable motion vectors are extracted on the basis of the result of judgment of reliability with respect to motion vectors for each motion vector detecting area which is found in the step 10 of the previous 2D/3D converting processing.

(4) In the step 4, only motion vectors the vertical components of which are smaller than a predetermined value out of the reliable motion vectors extracted in the step 3 are extracted.

(5) In the step 5, the average value of the horizontal components of the reliable motion vectors which are extracted in the step 4 (effective horizontal motion vectors) is calculated.

(6) In the step 6, field delay calculating processing based on the average value of the effective horizontal motion vectors which is calculated in the step 5 is performed. The details of the field delay calculating processing will be described later.

(7) In the step 7, it is judged which of an automatic mode and a manual mode is set on the basis of the data accepted and stored in the step 2.

(8) When it is judged in the step 7 that the manual mode is set, a field delay is fixed to the set value accepted in the step 2 (step 8).

(9) It is judged in the step 7 that the automatic mode is set, hysteresis data used in the field delay calculating processing in the step 6 is updated (step 9).

(10) In the step 10, data required to detect motion vectors is accepted from the motion vector detecting circuit 16, and a motion vector for each of the motion vector detecting areas is calculated. In addition, the reliability of the motion vector is judged for each motion vector detecting area on the basis of the average value and the minimum value of accumulated correlation values for each of the motion vector detecting areas. The calculated motion vector and the result of judgment of the reliability are stored in the RAM 22.

(11) In the step 11, cinema mode detecting and controlling processing is performed. The details of the cinema mode detecting and controlling processing will be described later.

(12) In the step 12, scene change detecting and controlling processing is performed. The details of the scene change detecting and controlling processing will be described later.

Figure 3:
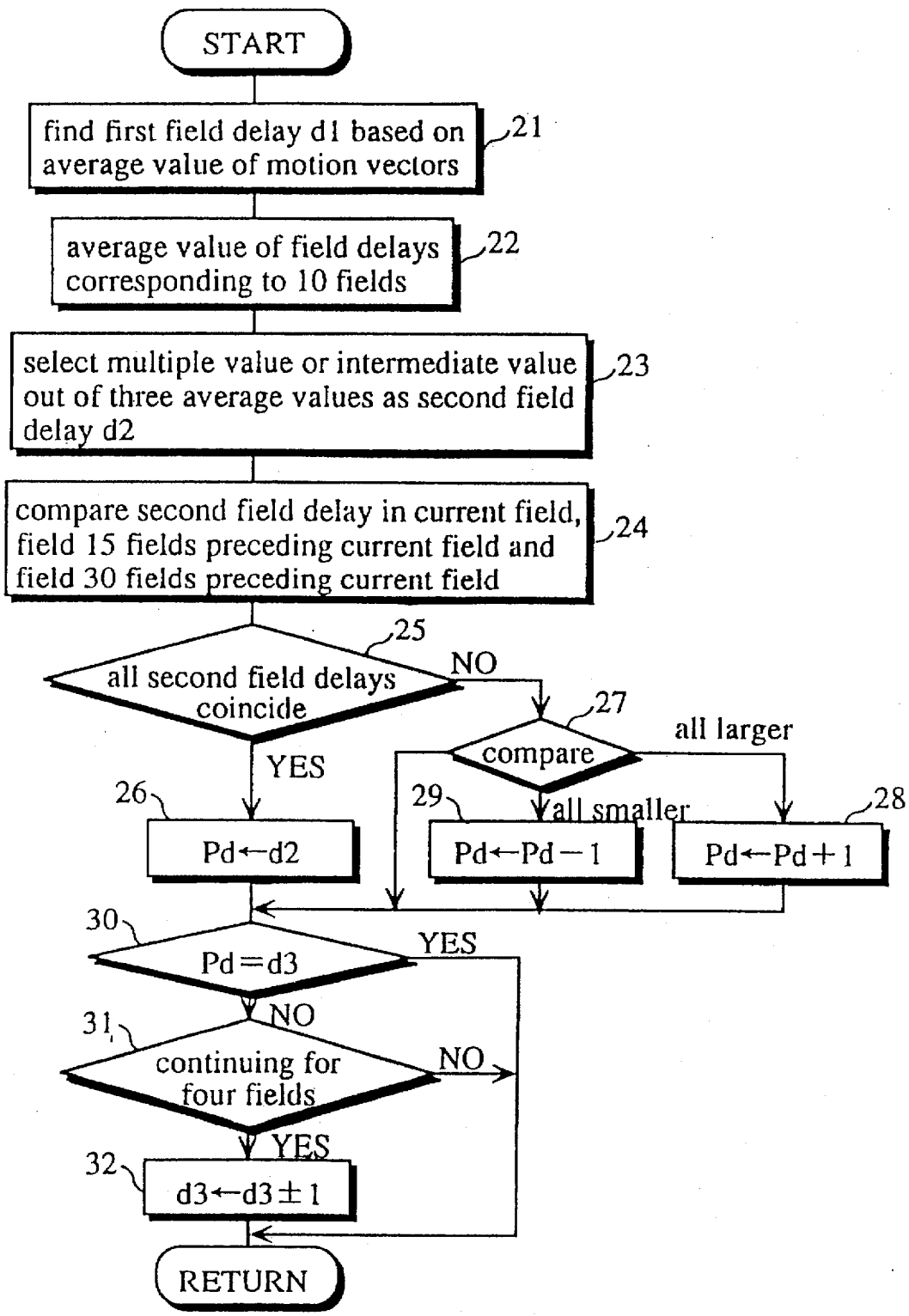

FIG. 3 shows the detailed procedure for the field delay calculating processing in the step 6 shown in FIG. 2a.

A first field delay d1 is first found (step 21). Examples of a method of determining a first field delay d1 include a plurality of methods as described below.

(1) Description of a first method of determining a first field delay d1.

The first method of determining a first field delay d1 will be described. In the first determining method, a first field delay d1 is found on the basis of the field delay scale factor setting signal set and stored in the foregoing step 2 and the average value v of the effective horizontal motion vectors found in the foregoing step 5 (hereinafter referred to as the average value of motion vectors).

Figure 4:
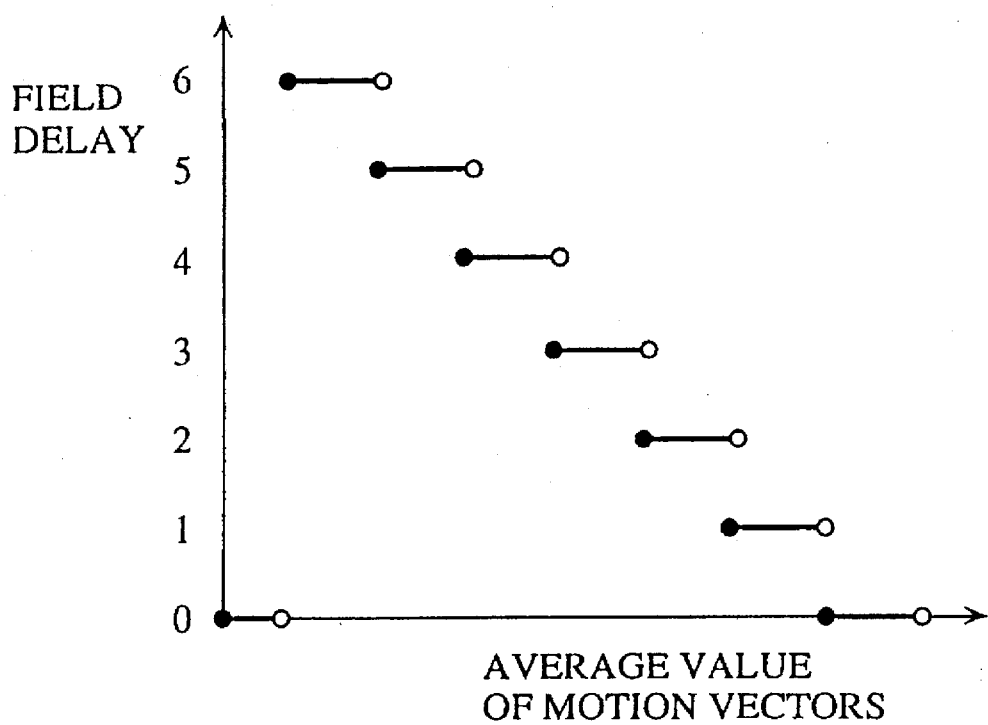
FIG. 4 is a graph showing the relationship between an average value of motion vectors and a first field delay.

FIG. 4 illustrates the relationship between the average value of motion vectors and a field delay. The relationship as shown in FIG. 4 is stored as a field delay table in the ROM 21. The field delay corresponding to the average value of motion vectors is found from the field delay table.

Parallax differs depending on the conditions of a 3D display device (a monitor), that is, the type of monitor and the conditions under which the monitor is seen even if the same 3D image signal is used. Therefore, the field delay found from the field delay table is multiplexed by the value of the field delay scale factor setting signal set and stored in the foregoing step 2 so as to obtain a similar 3D effect or conform to the taste of a viewer irrespective of the conditions of the monitor, thereby to find the first field delay d1.

(2) Description of a second method of determining a first field delay d1

A plurality of types of field delay tables are stored so as to obtain the same 3D effect irrespective of the conditions of the monitor, and an instruction to select a field delay table corresponding to the conditions of the monitor or the taste of the viewer is inputted from the operating and displaying unit 23. A field delay corresponding to the average value of motion vectors is found from the selected field delay table. The found field delay is taken as a first field delay d1.

(3) Description of a third method of determining a first field delay d1

Figure 5:
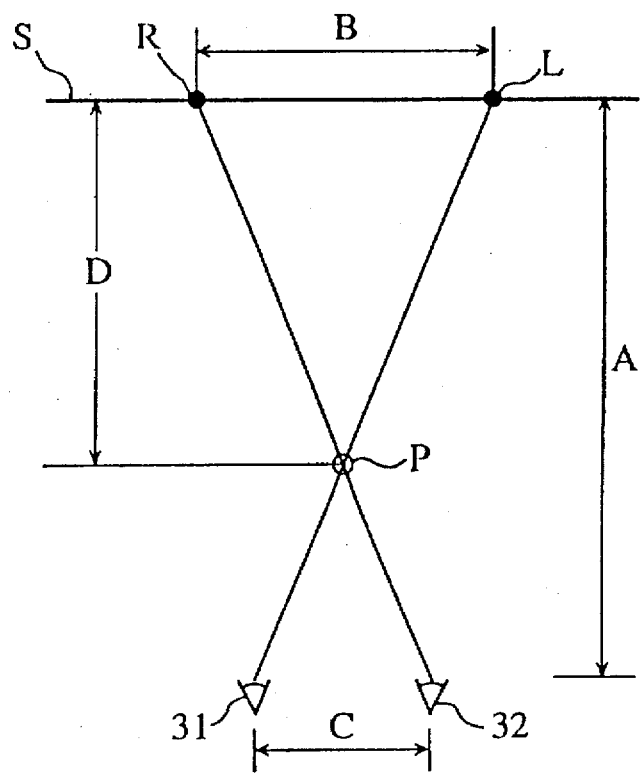
FIG. 5 is a typical diagram for explaining a method of leading to a relational expression for finding a first field delay from an average value of motion vectors.

Furthermore, a first field delay d1 may be found on the basis of not a field delay table but a predetermined relational expression. A method of finding the relational expression in this case will be described with reference to FIG. 5.

The suitable spacing between a monitor surface S and the eyes 31 and 32 of the viewer is taken as a proper viewing distance A [mm]. In addition, the spacing between a right image R and a left image L of a viewed object on the monitor surface S is taken as parallax B [mm]. Further, the distance between the eyes is taken as C [mm]. The proper viewing distance A is determined by the conditions of the monitor. The parallax B of the viewed object differs depending on the conditions of the monitor even if the same 3D image signal is used.

The position P of a 3D image of the viewed object is determined by the proper viewing distance A, the parallax B and the distance between the eyes C. That is, an amount D [mm] by which the viewed object is raised forward against the monitor surface S is determined by the proper viewing distance A, the parallax B and the distance between the eyes C.

The parallax B for setting the amount by which the viewed object is raised forward against the monitor surface S to a predetermined amount D is represented by the following equation (1) irrespective of the conditions of the monitor:

$$B = D \cdot C / (A - D) \tag{1}$$

Letting H [mm] be the horizontal length of the monitor, h [pixel] be the number of pixels in the horizontal direction of the monitor, v [pixel/field] be the average value of motion vectors, and d1 [field] be a first field delay, the following relationship holds:

$$d1 \cdot v = (h/H) \cdot B \tag{2}$$

When an amount obtained by converting the parallax B into the number of pixels (=(h/H)·B) is set to an amount of adjustment X set by the operating and displaying unit 23 (data related to the conditions of the monitor or data conforming to the taste of the viewer), the first field delay d1 is found by the following relational expression:

$$d1 = X/v \tag{3}$$

(4) Description of a fourth method of determining a first field delay d1

When the fourth determining method is used, a 3D effect adjuster for adjusting a 3D effect is provided in the operating and displaying unit 23. In addition, field delay tables of types corresponding to volumes in a plurality of steps which can be set by the 3D effect adjuster are stored in the ROM 21. Further, amounts of horizontal phase shift of types corresponding to the volumes in the plurality of steps which can be set by the 3D effect adjuster are stored in the ROM 21.

One example of the relationship of amounts of parallax and amounts of phase shift to the volumes in a plurality of steps which can be set by the 3D effect adjuster is shown in FIG. 30. In this example, it is possible to make adjustment in four steps in the direction in which the 3D effect becomes strong and four steps in the direction in which the 3D effect becomes weak, centered around the standard. Specifically, it is possible to make adjustment of the 3D effect in nine steps.

The amount of parallax (unit: pixel) is an indication to what extent the amount of parallax should be set in each volume. In principle, a field delay table corresponding to each volume is so produced that the amount of parallax becomes the amount of parallax shown in FIG. 30. Letting V be a motion vector and D be a field delay, the amount of parallax is represented by V×D.

Figure 31:
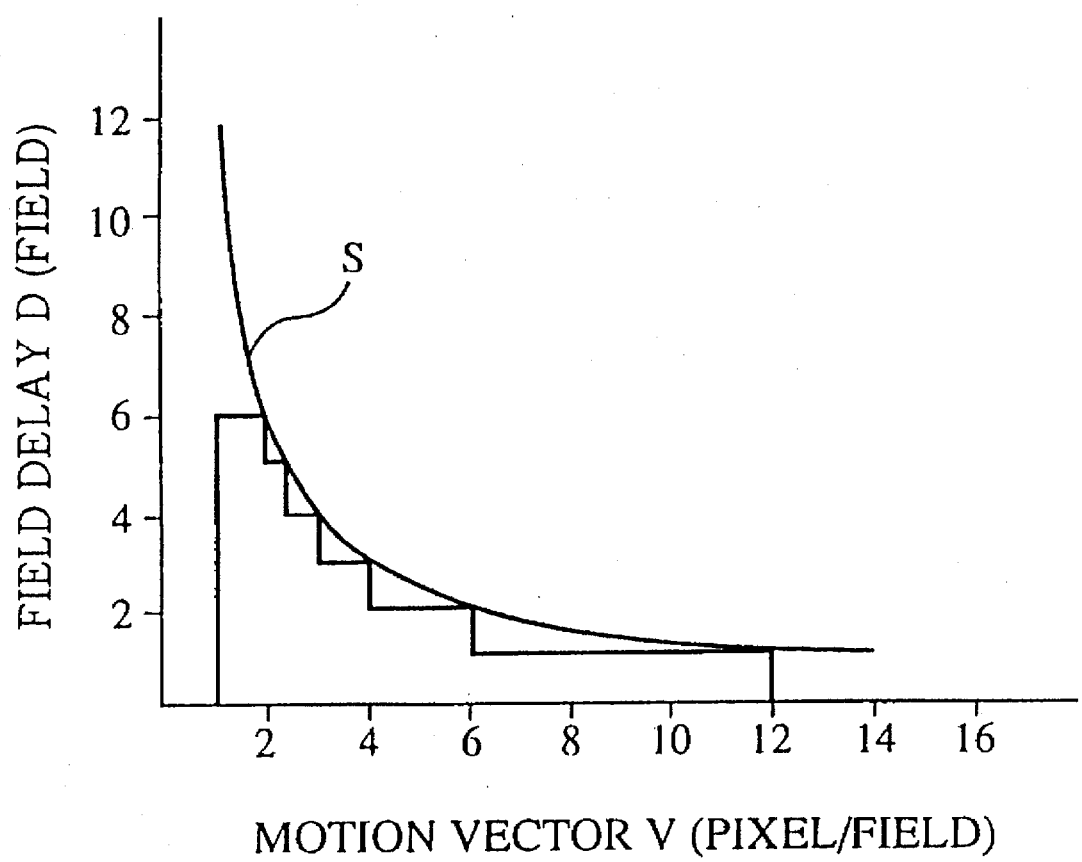
FIG. 31 is a graph showing the relationship between a motion vector and a field delay which correspond to a volume "0"

FIG. 31 shows the relationship between a motion vector V and a field delay D which correspond to a volume "0" (standard). A curve S in FIG. 31 represents a graph (D=12/V) determined by an amount of parallax "12" corresponding to the standard shown in FIG. 30. In FIG. 31, a polygonal line represents the relationship between the motion vector V actually used and a field delay D. A field delay table corresponding to the volume "0" (standard) is produced on the basis of the relationship between the motion vector V and the field delay D which is represented by the polygonal line shown in FIG. 31, and is stored in the ROM 21.

Figure 32:
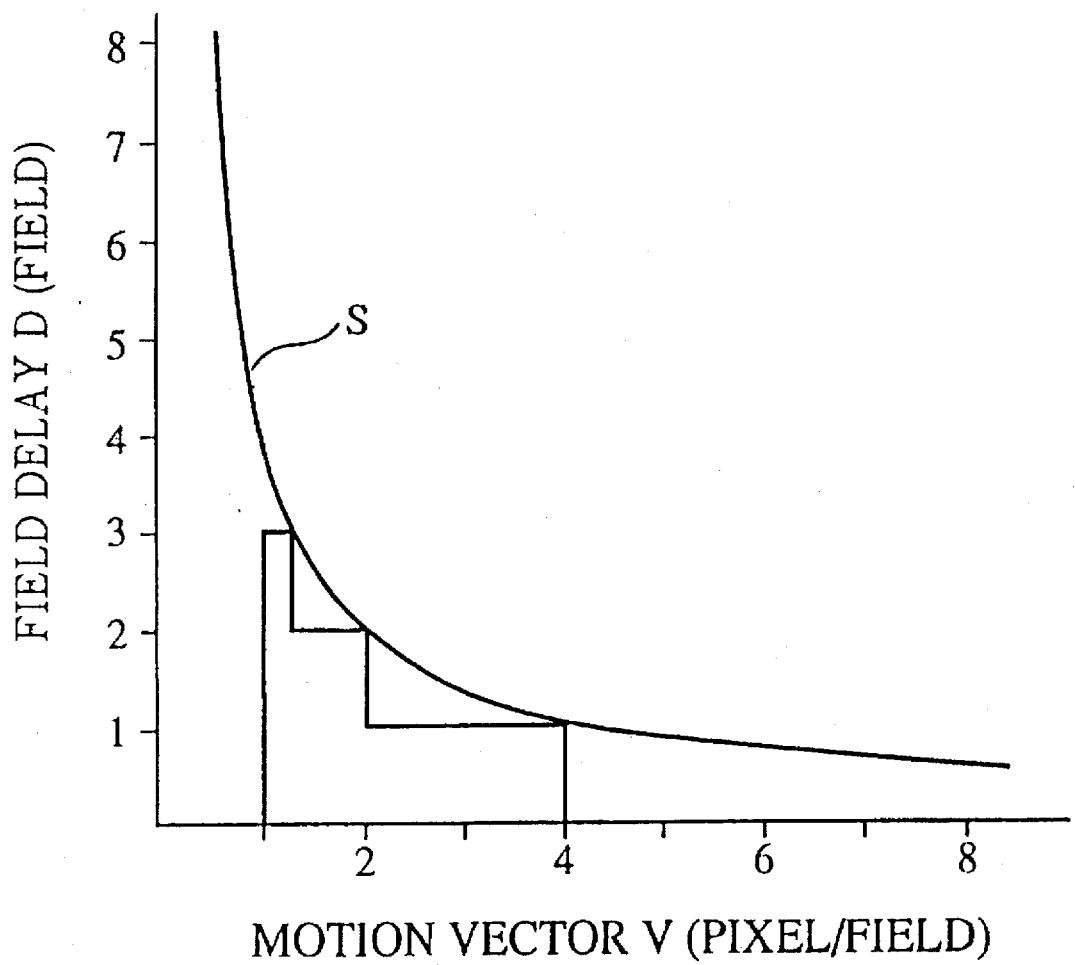
FIG. 32 is a graph showing the relationship between a motion vector and a field delay which correspond to a volume "−4"

FIG. 32 shows the relationship between a motion vector V and a field delay D which correspond to a volume "−4" (weakest). A curve S in FIG. 32 represents a graph (D=4/D) determined by an amount of parallax "4" corresponding to the volume "4" shown in FIG. 30. In addition, a field delay table corresponding to the volume "−4" is produced on the basis of the relationship between the motion vector and the field delay D which is represented by a polygonal line shown in FIG. 32, and is stored in the ROM 21.

Figure 33:
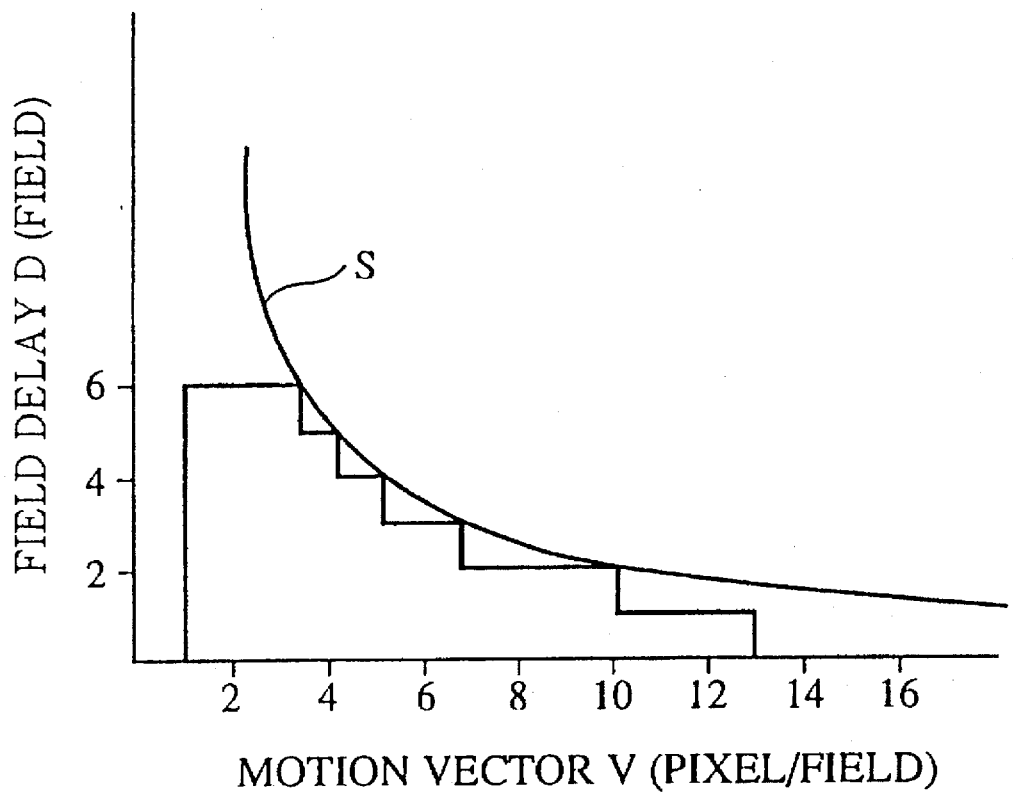
FIG. 33 is a graph showing the relationship between a motion vector and a field delay which correspond to a volume "4"

FIG. 33 illustrates the relationship between a motion vector V and a field delay D which correspond to a volume "4" (the strongest). A curve S in FIG. 33 represents a graph (D=20/V) determined by an amount of parallax "20" corresponding to the volume "4" shown in FIG. 30. In addition, a field delay table corresponding to the volume "4" is produced on the basis of the relationship between the motion vector and the field delay D which is represented by a polygonal line shown in FIG. 33, and is stored in the ROM 21.

Field delay tables corresponding to the other volumes "−3", "−2", "−1", "1", "2" and "3" are similarly produced, and are stored in the ROM 21.

Each of the amounts of phase shift (unit: pixel) shown in FIG. 30 indicates the sum of amounts of phase shift used in the respective phase shift controlling circuits 14 and 15 shown in FIG. 1. In this example, the direction of phase shift is determined to be left with respect to a left eye image, while being determined to be right with respect to a right eye image. Specifically, in phase control carried out by the phase controlling circuit 14, the direction of phase shift always becomes left. On the other hand, in phase control carried out by the phase controlling circuit 15, the direction of phase shift always becomes right.

When the amount of phase shift shown in FIG. 30 is even, the amount of phase shift used in each of the phase controlling circuits 14 and 15 is determined to be one-half the amount of phase shift shown in FIG. 30. When the amount of phase shift shown in FIG. 30 is odd, it cannot be divided by 2, whereby the amount of phase shift used in one of both the phase controlling circuits 14 and 15 is made larger by one pixel than the amount of phase shift used in the other phase controlling circuit. It is possible to carry out phase control even by a unit which is one-half of one pixel by interpolation or the like. Even when the amount of phase shift shown in FIG. 30 is odd, therefore, the amount of phase shift used in each of the phase controlling circuits 14 and 15 may be determined to be one-half the amount of phase shift shown in FIG. 30.

When the fourth determining method is employed, the volume set by the 3D effect adjuster is accepted in the step 2 shown in FIG. 2a. In the step 6 shown in FIG. 2a and more specifically, in the step 21 shown in FIG. 3, the first field delay d1 corresponding to the average value v of motion vectors is found from the field delay table corresponding to the volume set by the 3D effect adjuster.

Furthermore, in the step 1 shown in FIG. 2a, the amount of phase shift used in each of the phase controlling circuits 14 and 15 is determined on the basis of the amount of phase shift corresponding to the volume set by the 3D effect adjuster. The determined amount of phase shift, along with the above described direction of phase shift, is sent to each of the phase controlling circuits 14 and 15 through the memory control circuit 24.

Specifically, when the fourth determining method is employed, one of the plurality of field delay tables is selected by the 3D effect adjuster, and the amount of phase shift used in each of the phase controlling circuits 14 and 15 is determined.

Figure 34A:
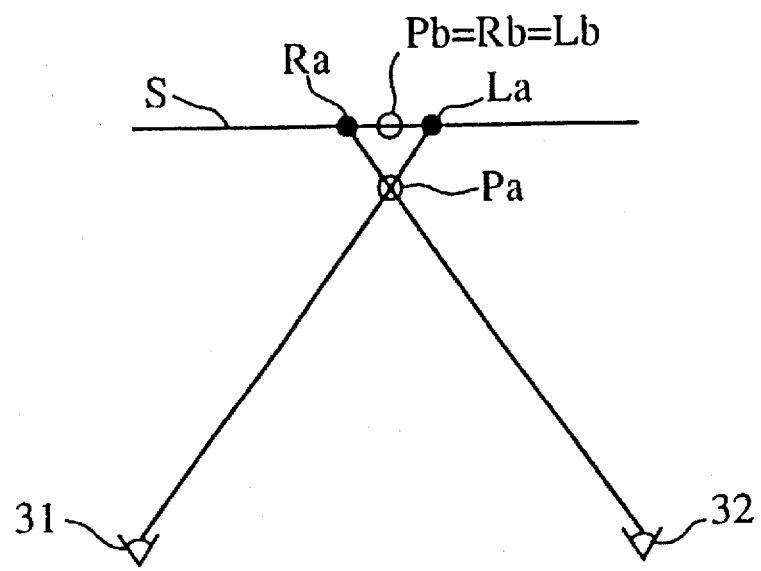
FIGS. 34a, 34b and 34c are typical diagrams showing the changes in the positions of 3D images of a viewed object and a still object which is a background by only field delay in cases where the volume is set to "−4", "0", and "4" with respect to the same image.
Figure 34B:
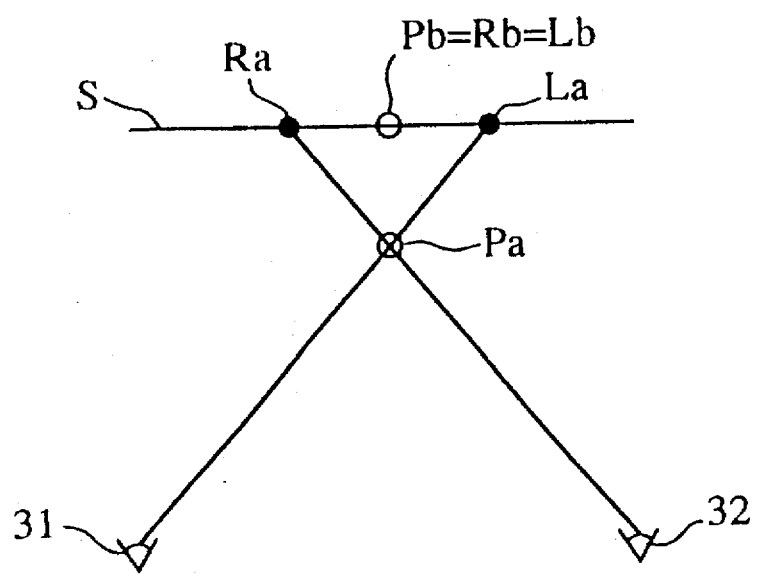
Figure 34C:
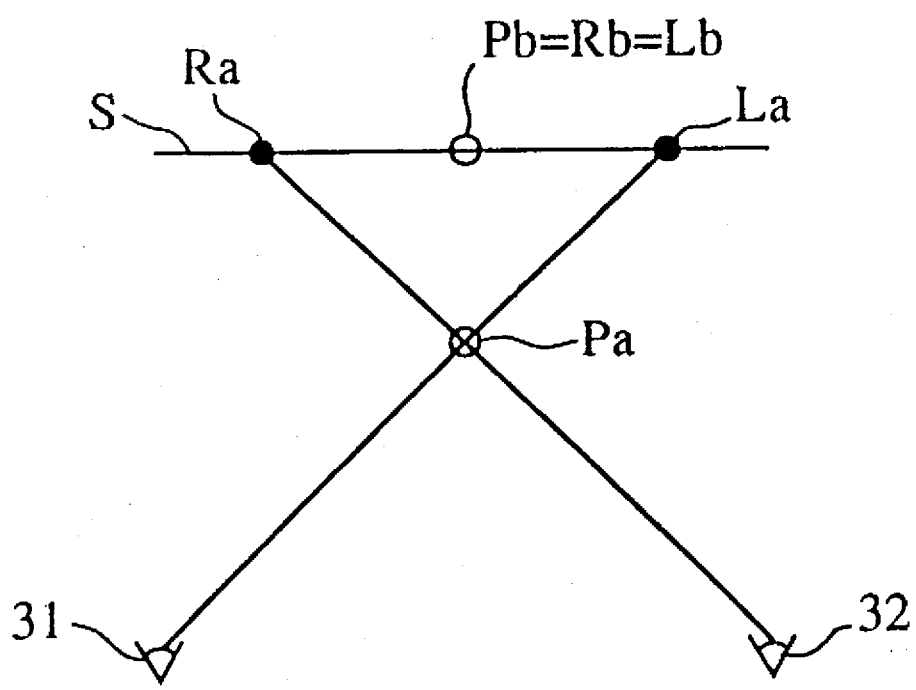

FIGS. 34a, 34b and 34c illustrate the change in the position of a 3D image of a viewed object due to only field delay in cases where the volume is set to "−4" (see FIG. 34 (a)), "0" (see FIG. 34 (b)), and "4" (see FIG. 34 (C)) with respect, to the same image. In FIGS. 34a, 34b and 34c, reference numeral 31 denotes the left eye of the viewer, reference numeral 32 denotes the right eye of the viewer, symbol Ra denotes a right image of the viewed object on the monitor surface S, and symbol La denotes a left image of the viewed object on the monitor surface S, symbol Pa denotes the position of a 3D image of the viewed object, and symbol Pb (=Rb=Lb) denotes the position of a still object which is a background. The distance between the right image R and the left image L of the viewed object is the amount of parallax. The surface of the background coincides with the monitor surface S. As can be seen from FIGS. 34a, 34b and 34c, the larger the volume is, the larger the amount of parallax is, and the larger the amount by which the viewed object is raised forward against the surface of the background (the monitor surface S) is, whereby a 3D effect is increased.

Figure 35A:
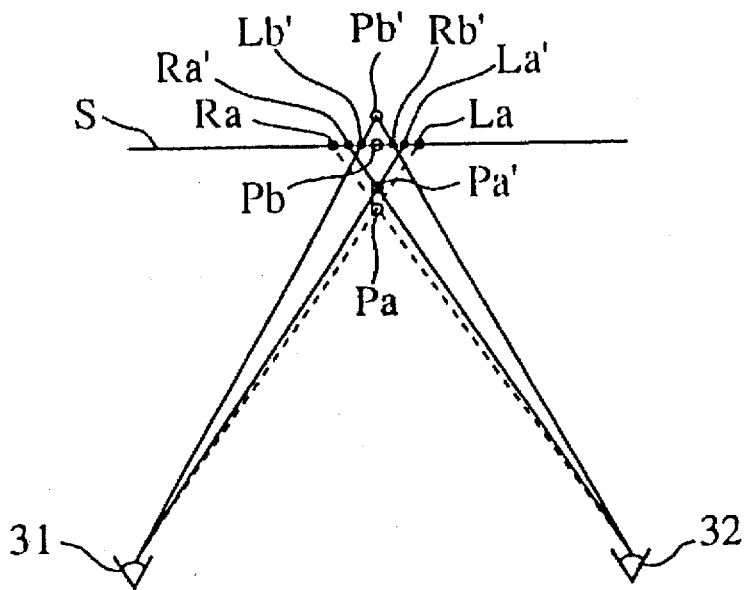
FIGS. 35a, 35b and 35c are typical diagrams showing the changes in the positions of 3D images of a viewed object and a still object which is a background by only field delay and phase shift in cases where the volume is set to "−4", "0", and "4" with respect to the same image.
Figure 35B:
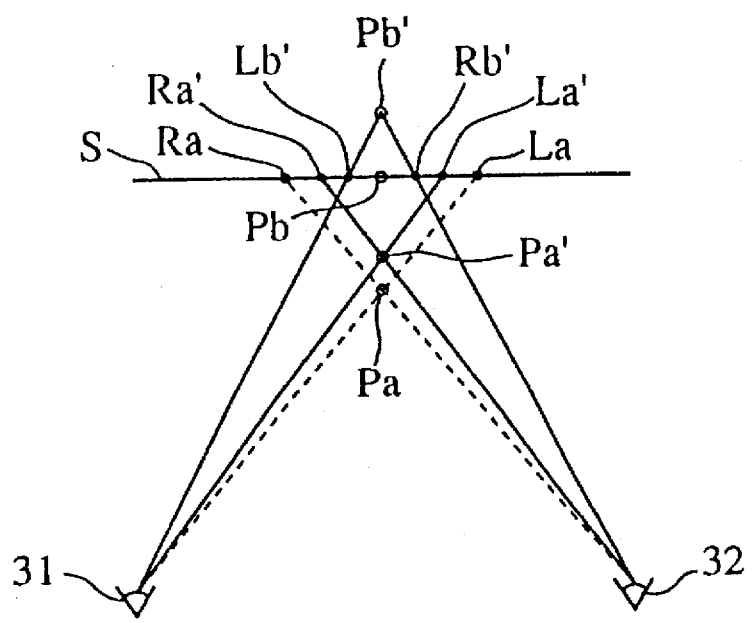
Figure 35C:
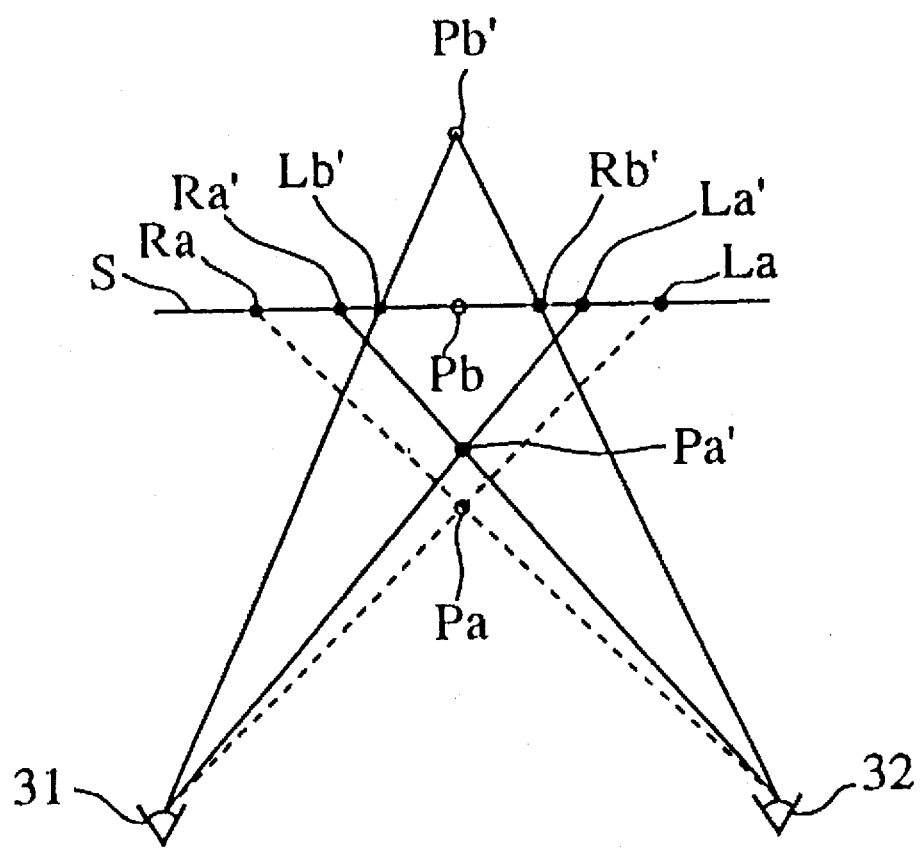

FIGS. 35a, 35b and 35c show the change in the positions of 3D images of a viewed object and a still object which is a background due to field delay and phase shift in cases where the volume is set to "−4" (see FIG. 35 (a)), "0" (see FIG. 35 (b)), and "4" (see FIG. 35 (C)) with respect to the same image. That is, FIGS. 35a, 35b and 35c illustrate the change in the positions of 3D images of a viewed object and a still object which is a background in a case where the fourth determining method is employed. In FIGS. 35a, 35b and 35c, the same reference numerals and symbols as those shown in FIGS. 34a, 34b and 34c indicate the change in the positions of the 3D images of the viewed object and the still image which is a background due to only field delay.

In FIGS. 35a, 35b and 35c, reference numeral 31 denotes the left eye of the viewer, reference numeral 32 denotes the right eye of the viewer, symbol Ra' denotes a right image of the viewed object on the monitor surface S, and symbol La' denotes a left image of the viewed object on the monitor surface S, and symbol Pa' denotes the position of the 3D image of the viewed object. In addition, symbol Rb' denotes a right image of the still object (the background) on the monitor surface S, symbol Lb' denotes a left image of the still object (the background) on the monitor surface S, and symbol Pb' denotes the position of the 3D image of the still object.

As can be seen from comparison between FIGS. 34a, 34b and 34c and FIGS. 35a, 35b and 35c, the position Pb' of the 3D image of the background (the still object) and the position Pa' of the 3D image of the viewed object in FIGS. 35a, 35b and 35c are respectively moved backward on the basis of the monitor surface S from the position Pb of the background (the still object) and the position Pa of the 3D image of the viewed object in FIGS. 34a, 34b and 34c. That is, the position Pb' of the 3D image of the background (the still object) is moved backward on the basis of the monitor surface S, the position Pa' of the 3D image of the viewed object comes closer to the monitor surface S than the position Pa of the 3D image of the viewed object in FIGS. 34a, 34b and 34c. The position Pb' of the 3D image of the background (the still object) and the position Pa' of the 3D image of the viewed object are moved backward on the basis of the monitor surface C, thereby to amplify a 3D effect.

Although in the above described example, the phase is shifted rightward with respect to the right eye image and leftward with respect to the left eye image, the phase may be shifted in the opposite direction.

When the first field delay d1 is found in any one of the foregoing methods, an average value of field delays corresponding to 10 fields from the current field to a field which is nine fields preceding the field, an average value of field delays corresponding to 10 fields from a field which is one field preceding the current field to a field which is nine fields preceding the field, and an average value of field delays corresponding to 10 fields from a field which is two fields preceding the current field to a field which is nine fields preceding the field are respectively calculated on the basis of field delay hysteresis data (step 22).

The field delay hysteresis data used in the step 22 is the first field delay d1 obtained in the step 21 in the past.

If not less than two of the three average values are the same, the value (a multiple value) is selected as a second field delay d2. If all of the average values differ, an intermediate value is selected as a second field delay d2 (step 23).

Either one of the second field delay d2 selected in the step 23 and a second field delay d2 in one of fields which are 12 to 18 fields preceding the current field (for example, a field which is 15 fields preceding the current field) is compared with a second field delay d2 in a field which is 30 fields preceding the current field (step 24). Field delay hysteresis data used in the step 24 is the second field delay d2 obtained in the step 23 in the past.

When all the second field delays d2 coincide (YES in step 25), a target field delay Pd is changed into the second field delay selected in the step 23 (Pd=d2) (step 26), after which the program proceeds to the step 30. When the three second field delays d2 (which are represented by d2-1, d2-2 and d2-3 in the order from the past) are changed so that all the second field delays d2 coincide, as shown in FIG. 6, therefore, the target field delay Pd is changed into the second field delay (d2-3).

When all the second field delays d2 do not coincide (NO in the step 25), it is judged whether all the second field delays d2 are larger than the target field delay Pd, are smaller than the target field delay Pd, or are neither larger nor smaller than the target field delay Pd (step 27).

When all the second field delays d2 are larger than the target field delay Pd, one is added to the target field delay Pd (Pd=Pd+1) (step 28), after which the program proceeds to the step 30. For example, when the three second field delays d2 (which are represented by d2-1, d2-2 and d2-3 in the order from the past) are changed so that all the second field delays d2 are larger than the target field delay Pd, as shown in FIG. 7, one is added to the target field delay Pd.

When all the second field delays d2 are smaller than the target field delay Pd, one is subtracted from the target field delay Pd (Pd=Pd−1) (step 29), after which the program proceeds to the step 30. When all the second field delays d2 are neither larger nor smaller than the target field delay Pd, the program proceeds to the step 30.

In the step 30, it is judged whether or not the target field delay Pd and a field delay currently actually set (a set field delay d3) coincide with each other. When the target field delay Pd and the field delay d3 currently set do not coincide with each other, it is judged whether or not the set field delay d3 has already been continuing for four fields (step 31). When the set field delay d3 currently set has already been continuing for four fields, the set field delay d3 is changed by one in the direction in which it approaches the target field delay Pd (d3=d3±1) (step 32). The program then proceeds to the step 7 shown in FIG. 2b.

When it is judged in the foregoing step 30 that the target field delay Pd and the set field delay d3 coincide with each other, or when it is judged in the foregoing step 31 that the set field delay d3 has not been continuing for four fields, the program proceeds to the step 7 shown in FIG. 2b without changing the field delay.

Specifically, in this example, the set field delay d3 is so controlled that it approaches the target field delay Pd in units of four fields and one field at a time.

When the first field delay d1 is first calculated in the step 21 after the power supply is turned on, the second field delay d2, the target field delay Pd and the set field delay d3 become equal to d1.

In the processing shown in FIG. 3, only the average value of the field delays corresponding to 10 fields from the current field to a field which is nine fields preceding the current field may be calculated and taken as a target field delay in the step 22, to omit the processing in the steps 23, 24, 25, 26, 27, 28 and 29.

Furthermore, only the average value of the field delays corresponding to 10 fields from the current field to a field which is nine fields preceding the current field may be calculated and taken as a second field delay in the step 22, to omit the processing in the step 23.

Furthermore, the second field delay found in the step 23 may be taken as a target field delay, to omit the processing in the steps 24, 25, 26, 27, 28 and 29.

Additionally, the processing in the steps 22 and 23 may be omitted. In this case, the first field delay d1 found in the step 21 is used as the second field delay used in the step 24.

Figure 36:
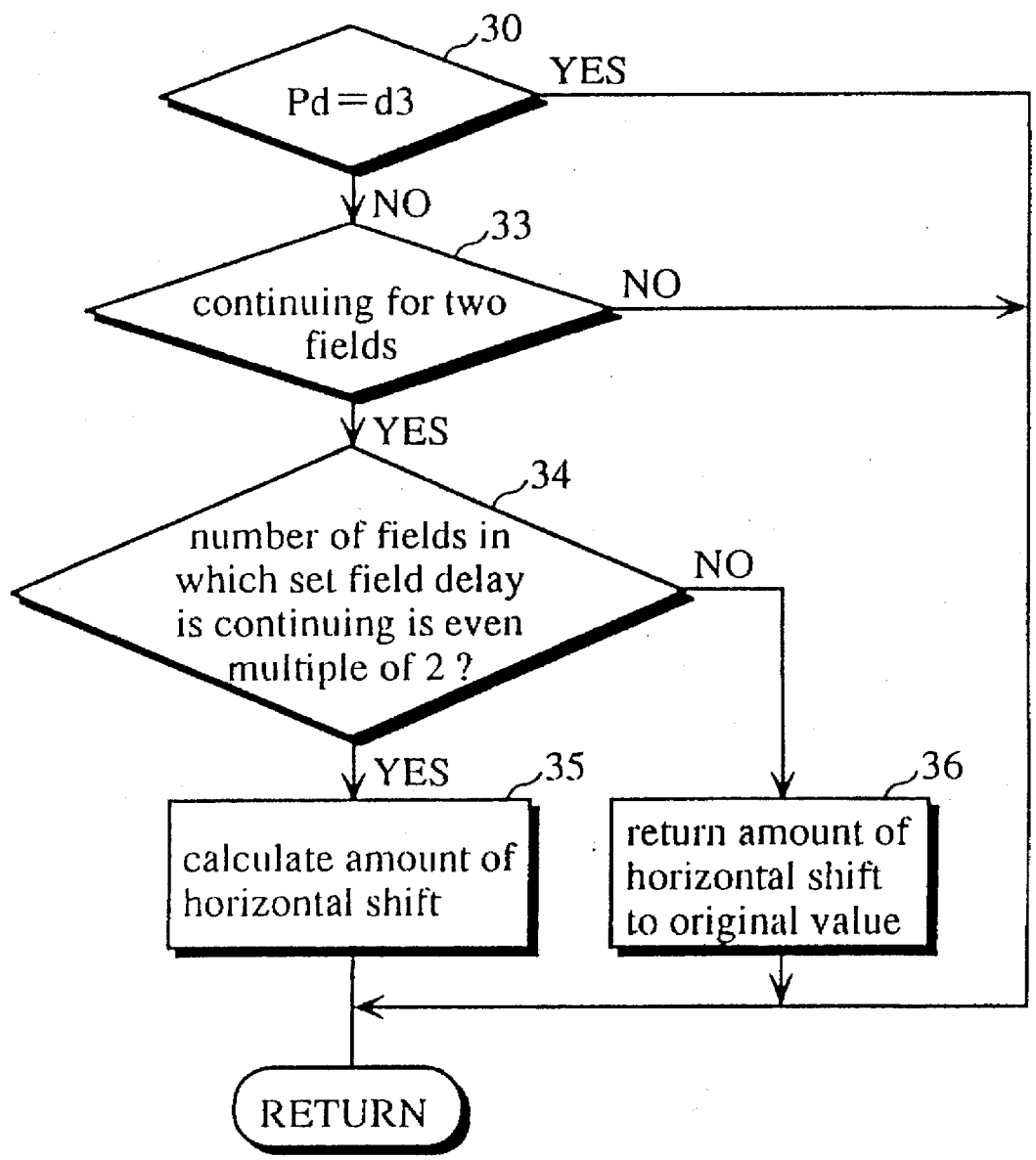
FIG. 36 is a flow chart showing a modified example of processing in the step 30 and the subsequent steps shown in FIG. 3.

FIG. 36 shows a modified example of the processing in the step 30 and the subsequent steps shown in FIG. 3, that is, the steps 31 and 32. The steps 21 to 30 are the same as those shown in FIG. 3 and hence, the illustration of the steps 21 to 29 is omitted. Processing in predetermined steps out of the steps 21 to 30 can be omitted as described above.

It is judged in the step 30 whether or not a target field delay Pd and a field delay currently actually set (a set field delay d3) coincide with each other. When the target field delay Pd and the set field delay d3 do not coincide with each other, it is judged whether or not the set field delay d3 has already been continuing for two fields (step 33).

When the set field delay d3 has already been continuing for two fields, it is judged whether the number of fields in which the set field delay d3 is continuing is an odd multiple of two or an even multiple of two (step 34).

When the number of fields in which the set field delay d3 is continuing is an even multiple of two, the following processing is performed (step 35), after which the program proceeds to the step 7 shown in FIG. 2b. That is, the set field delay d3 is changed by one in the direction in which it approaches the target field delay Pd (d3=d3±1).

Furthermore, an amount of horizontal shift by each of the phase controlling circuits 14 and 15 is so calculated that an amount of movement of a subject between fields corresponding to the change of the set field delay d3 is halved. The amount of horizontal shift is calculated on the basis of an average value of motion vectors between fields corresponding to the change of the set field delay d3. In other words, the amount of horizontal shift is so calculated that the set field delay d3 is substantially changed by 0.5 fields in the direction in which it approaches the target field delay Pd. It is preferable that the amount of horizontal shift is calculated only when the average value of motion vectors between fields corresponding to the change of the set field delay d3 is not less than a predetermined value.

When it is judged in the foregoing step 34 that the number of fields in which the set field delay d3 is continuing is an odd multiple of two, the amount of horizontal shift is returned to the original value, that is, a value set in the operating and displaying unit 23 (step 36). The program then proceeds to the step 7 shown in FIG. 2b.

When it is judged in the foregoing step 30 that the target field delay Pd and the set field delay d3 coincide with each other, or when it is judged in the foregoing step 33 that the set field delay d3 has not been continuing for two fields, the program proceeds to the step 7 shown in FIG. 2b without changing the field delay.

Figure 37:
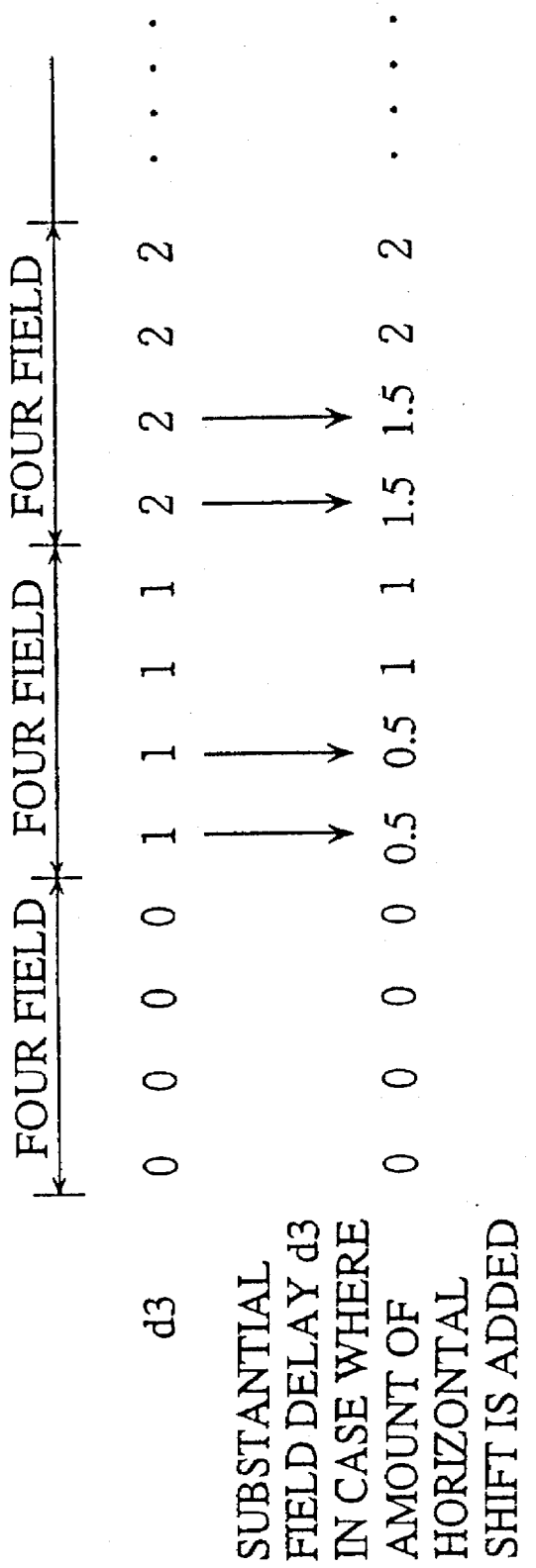
FIG. 37 is a timing chart showing the change in a substantial field delay in a case where processing in a modified example of FIG. 36 is performed.

Specifically, also in this modified example, the set field delay d3 is so controlled as to approach the target field delay Pd in units of four fields and one field at a time. For example, as shown in FIG. 37, the set field delay d3 is changed in units of four fields and one field at a time, for example, 0, 0, 0, 0, 1, 1, 1, 1, 2, 2, 2, 2 . . . In this modified example, however, the amount of horizontal shift by each of the phase control circuits 14 and 15 is so adjusted that the amount of movement of the subject between fields Corresponding to the change of the set field delay d3 is halved, whereby the same effect as that in a case where the set field delay d3 is changed, for example, 0, 0, 0, 0, 0.5, 0.5, 1, 1, 1.5, 1.5, 2, 2 . . . , as shown in FIG. 37, is substantially obtained.

In this modified example, therefore, an amount by which a 3D image obtained is raised forward is smoothly changed, thereby to obtain a 3D image which is easy to see.

Figure 38:
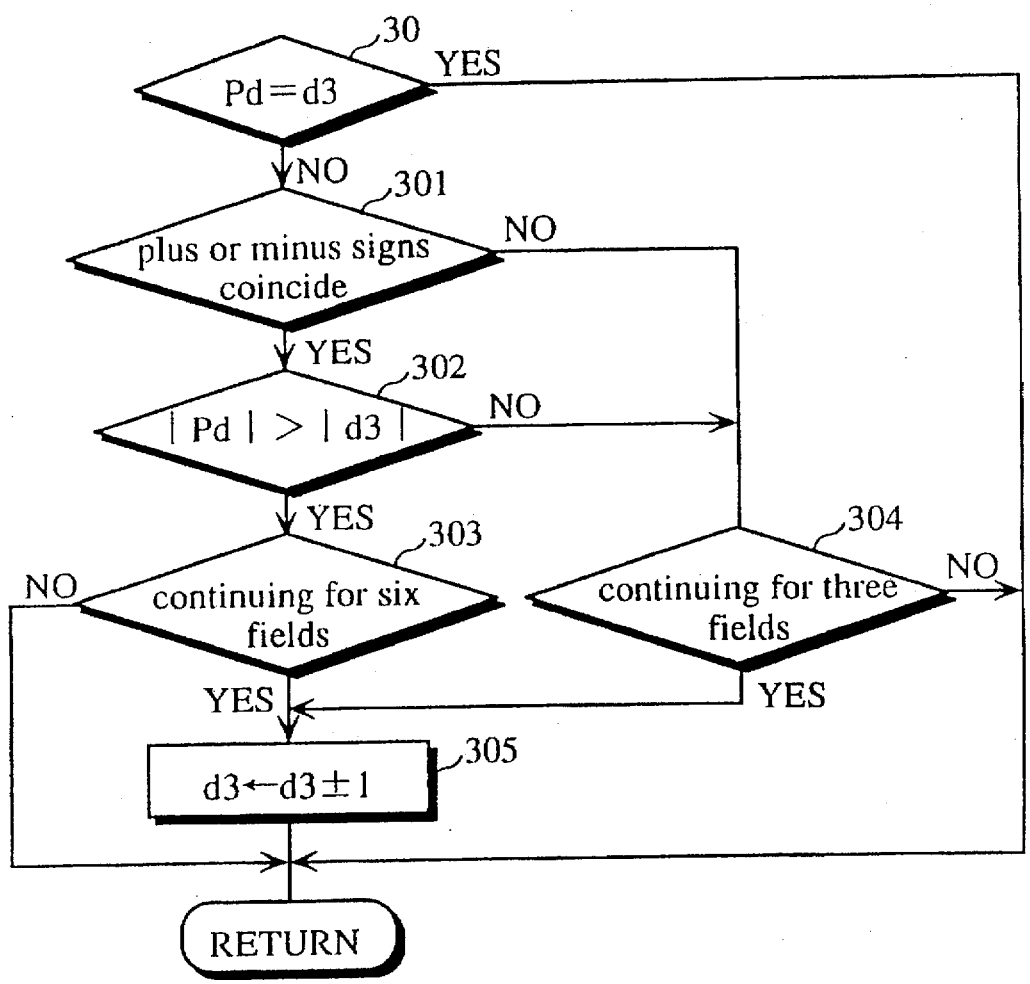
FIG. 38 is a flow chart showing another modified example of processing in the step 30 and the subsequent steps shown in FIG. 3.

FIG. 38 shows another modified example of the processing in the step 30 and the subsequent steps shown in FIG. 3. The steps 21 to 30 are the same as those shown in FIG. 3 and hence, the illustration of the steps 21 to 29 is omitted. Processing in predetermined steps out of the steps 21 to 30 can be omitted as described above.

It is considered that examples of the relationship between a target field delay Pd calculated in the step 26, 28 or 29 and a set field delay d3 set at the time point in a case where the answer is in the negative in the step 30 shown in FIG. 3, that is, in a case where the target field delay Pd and the set field delay d3 do not coincide with each other include the following three types:

(a) a case where the plus or minus sign of the target field delay Pd is different from the plus or minus sign of the set field delay d3, (b) a case where the plus or minus sign of the target field delay Pd is the same as the plus or minus sign of the set field delay d3, and the absolute value of the target field delay Pd is smaller than the absolute value of the set field delay d3, and (c) a case where the plus or minus sign of the target field delay Pd is the same as the plus or minus sign of the set field delay d3, and the absolute value of the target field delay Pd is larger than the absolute value of the set field delay d3.

In a method of processing in the steps 30 to 32 shown in FIG. 3, the field delay d3 is so determined that the same value of the field delay d3 is continuing in a period corresponding to four fields in any of the foregoing cases in order to prevent an image from so flittering as to be difficult to see when the field delay is immediately changed by the instantaneous change of an input image. When the change of the target field delay Pd is not an instantaneous change of an image, disadvantages may, in some cases, occur unless the set field delay d3 approaches the target field delay Pd, as described below.

When the target field delay Pd and the set field delay d3 are in the relationship as described in the foregoing item (a), it is considered that the direction of the movement of an image (the horizontal direction) is reversed. In such a case, therefore, a far and near feeling in 3D view is reversed unless the set field delay d3 is quickly brought near the target field delay Pd.

When the target field delay Pd and the set field delay d3 are in the relationship as described in the foregoing item (b), it is considered that the movement of an image becomes fast. In such a case, therefore, parallax is too increased unless the set field delay d3 is quickly brought near the target field delay Pd, whereby the same object is recognized as two objects.

When the target field delay Pd and the set field delay d3 are in the relationship as described in the foregoing item (c), it is considered that the movement of an image is slowed. In such a case, the amount of parallax is first only decreased even if the set field delay d3 is slowly brought near the target field delay Pd, whereby a normal image is obtained, although a 3D effect is reduced.

In the modified example shown in FIG. 38, when the target field delay Pd and the set field delay d3 are in the relationship as shown in the foregoing item (a), the set field delay d3 is quickly brought near the target field delay Pd in order to prevent a far and near feeling in 3D view from being reversed. In addition, when the target field delay Pd and the set field delay d3 are in the relationship as shown in the foregoing item (b), the set field delay d3 is quickly brought near the target field delay Pd in order to prevent parallax from being too increased. When the target field delay Pd and the set field delay d3 are in the relationship as shown in the foregoing item (c), there is little necessity for the target field delay Pd and the set field delay d3 to quickly respond to each other, whereby the set field delay d3 is slowly brought near the target field delay Pd.

Description is now made of the procedure shown in FIG. 38.

It is judged in the step 30 whether or not the target field delay Pd and the field delay currently actually set (the set field delay d3) coincide with each other.

When the target field delay Pd and the set field delay d3 do not coincide with each other, it is judged whether or not the plus or minus sign of the target field delay Pd and the plus or minus sign of the set field delay d3 coincide with each other (step 301).

When the plus or minus sign of the target field delay Pd and the plus or minus sign of the set field delay d3 coincide with each other, it is judged whether or not the absolute value of the target field delay Pd is larger than the absolute value of the set field delay d3 (step 302).

When the absolute value of the target field delay Pd is larger than the absolute value of the set field delay d3, it is judged that the target field delay Pd and the set field delay d3 are in the relationship as described in the foregoing item (c), so that it is judged whether or not the set field delay d3 has already been continuing for six fields (step 303). When the set field delay d3 has already been continuing for six fields, the set field delay d3 is changed by one in the direction in which it approaches the target field delay Pd (d3=d3±1) (step 305). The program then proceeds to the step 7 shown in FIG. 2b.

When it is judged in the foregoing step 301 that the plus or minus sign of the target field delay Pd and the plus or minus sign of the set field delay d3 do not coincide with each other, it is judged that the target field delay Pd and the set field delay d3 are in the relationship as described in the foregoing item (a), so that it is judged whether or not the set field delay d3 has already been continuing for three fields (step 304). When the set field delay d3 has already been continuing for three fields, the set field delay d3 is changed by one in the direction in which it approaches the target field delay Pd (d3=d3±1) (step 305). The program then proceeds to the step 7 shown in FIG. 2b.

When it is judged that in the foregoing step 302 that the absolute value of the target field delay Pd is smaller than the absolute value of the set field delay d3, it is judged that the target field delay Pd and the set field delay d3 are in the relationship as described in the foregoing item (b), so that it is judged whether or not the set field delay d3 has already been continuing for three fields (step 304). When the set field delay d3 has already been continuing for three fields, the set field delay d3 is changed by one in the direction in which it approaches the target field delay Pd (d3=d3±1) (step 305). The program then proceeds to the step 7 shown in FIG. 2b.

When it is judged in the foregoing step 30 that the target field delay Pd and the set field delay d3 coincide with each other, when it is judged in the foregoing step 303 that the set field delay d3 has not been continuing for six fields, or when it is judged in the foregoing step 304 that the set field delay d3 has not been continuing for three fields, the program proceeds to the step 7 shown in FIG. 2b without changing the set field delay d3.

FIGS. 8 to 11 show the details of the cinema mode detecting and controlling processing in the step 11 shown in FIG. 2b.

Description is made of the outline of telecine conversion before describing the procedure for the processing.

The difference between the number of images per second of a cinema film (the number of frames of a cinema film) and the number of frames per second of a television is adjusted by a telecine system. The number of frames per second of standard cinema films 35 mm long and 16 mm long is 24. The number of frames per second of a cinema film 8 mm long is 16 or 18. On the other hand, the number of frames per second of an NTSC (National Television System Committee) color television is 30 (30 frames=60 fields).

As the telecine system, a general intermittent projector intermittently sends a film, irradiates light onto the film in a period during which the film is stopped in an image aperture, receives the film by a film camera and converts the film into an image signal, as indicated by Table 1.

TABLE 1

| film | number of frames of cinema film | conversion rule |
|---|---|---|
| 35 mm | 24 | light is irradiated twice onto first frame of cinema film light if irradiated three times onto second frame of cinema film (2 - 3 pull-down system) |
| 8 mm | 16 | 15 frames of cinema film per second are advanced at equal intervals light is irradiated four times per frame of cinema film |
|  | 18 | 20 frames of cinema film per second are advanced |
|  | 30 | 30 frames of cinema film per second are advanced light is irradiated twice per frame of cinema film (2 - 2 pull-down system) |

When an image obtained by the telecine system is seen by advancing frames of a cinema film (hereinafter referred to as a frame) for each field, a field which shows no movement appears at regular intervals. Consequently, as a motion vector detected for each field, a vector which shows no movement is detected at regular intervals if disturbance such as noise is ignored.

Figure 12:
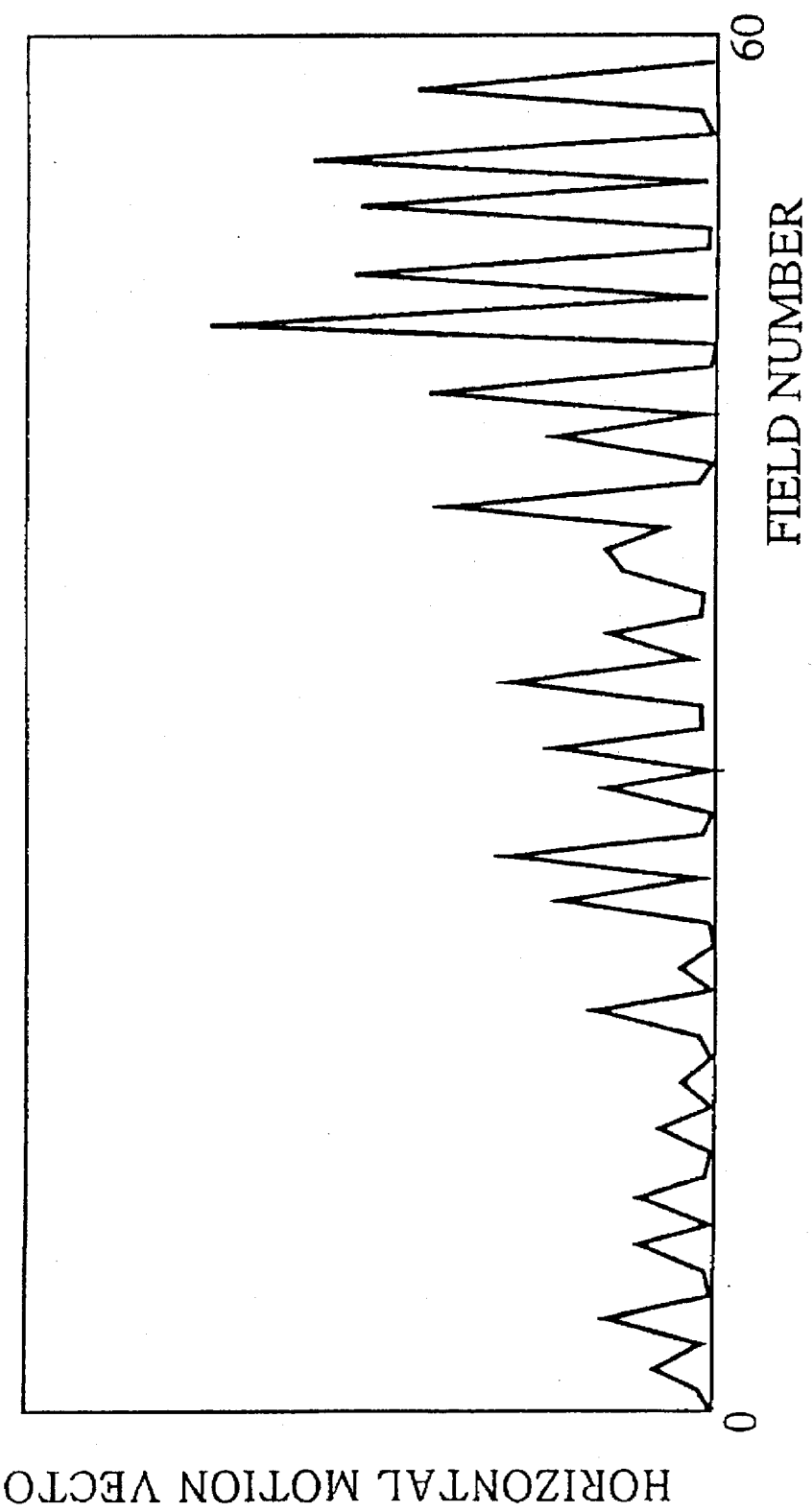
FIG. 12 is a graph showing the change in motion vectors with respect to a field corresponding to an image obtained by telecine conversion using a 2–3 pull-down system.

FIG. 12 illustrates an example of the change of a motion vector with respect to an image obtained from a cinema film which is composed of 24 frames per second. In this example, the motion vector repeats a pattern of $\alpha \to 0 \to \beta 1 \to 0 \to 0 \to \alpha 2 \to 0 \to \beta 2 \to 0 \to 0$ for each change point of fields.

An important parameter for determining whether or not the image signal a inputted to the input terminal 1 shown in FIG. 1 is subjected to telecine conversion or how telecine conversion is made with respect to the image signal a is a motion vector. Specifically, it is possible to grasp the presence or absence of telecine conversion and a conversion rule by knowing how regularity causes the motion vector to be zero.

Since an average value of motion vectors obtained by a plurality of motion vector detecting areas is the final motion vector, however, disadvantages may, in some cases, occur. For example, in an image having two contrary movements directed from the left and the right to the center of an image area, the left and right movements are canceled when the average value of the motion vectors obtained by the motion vector detecting areas is found, thereby to make it difficult to accurately detect the motion vectors. In addition, ambiguity remains in the detected motion vectors. Even when the presence or absence of telecine conversion, for example, is judged by only the motion vectors, therefore, erroneous judgment may be made.

In cinema mode detecting and controlling processing as described later, devices for preventing erroneous judgment from being made as much as possible have been used.

Description is now made of the idea of field delay converting processing performed when a cinema mode (in which an image signal is subjected to telecine conversion) is detected.

Description is now made of the idea of field delay converting processing in a case where an image signal is subjected to telecine conversion using the 2–3 pull-down system.

The following are a field delay conversion rule in this case:

(a) Such conversion is made that a frame delay (the number of frames from a frame corresponding to an inputted image signal to a frame corresponding to a delayed image signal) in the current field is made as constant as possible.

(b) The number of fields assigned to one frame after the conversion shall be two or three in order to provide a smooth image even by only one eye.

(c) A field delay after the conversion (a field delay in the succeeding field) is so assigned that the frame delay is one when the field delay at the normal time (the set field delay d3 determined in the step 6 shown in FIG. 2a) is 1 to 3 (−1 to −3), and the frame delay is two when the field delay at the normal time is 4 to 6 (−4 to −6).

(d) When the frame delay is so changed as to be increased, three fields are assigned to one frame. On the contrary, when the frame delay is so changed as to be decreased, two fields are assigned to one frame.

(e) The field delay after the conversion is made as even as possible in order to select the image signal, which is not the output c of the interpolating circuit 12, out of the delayed image signals b and c shown in FIG. 1.

A mode in which a field corresponding to a delayed image outputted in the succeeding field is selected from fields preceding a field corresponding to a delayed image currently outputted (field return) is allowed shall be referred to as a compromise delay mode, and a mode in which the field return is inhibited shall be referred to as a complete delay mode.

An image signal obtained by telecine conversion using the 2–3 pull-down system is indicated as shown in FIG. 13. Symbols A, B, C . . . indicate the types of frames, and subscripts 1, 2, 3, . . . indicate field numbers.

FIGS. 14 to 17 show delayed images actually outputted by the cinema mode detecting and controlling processing when the input image signal a is the image signal shown in FIG. 13 and the complete delay mode is set.

FIG. 14 shows delayed images actually outputted when the field delay at the normal time is 1 to 3 (−1 to −3). In this case, the frame delay is one. In FIG. 14, an image corresponding to a numeral 0 in the upper column represents an image corresponding to the current field outputted as an image signal for one eye. In addition, images respectively corresponding to numerals 1 to 6 in the upper column represent images corresponding to field delays 1 to 6. An image put in parentheses represents a delayed image actually outputted.

FIG. 15 shows delayed images actually outputted when the field delay at the normal time is 4 to 6 (−4 to −6). In this case, the frame delay is two.

FIG. 16 shows delayed images actually outputted when the frame delay is changed from one to two.

FIG. 17 shows delayed images actually outputted when the frame delay is changed from two to one.

FIGS. 18 to 21 show delayed images actually outputted when the input image signal a is the image signal shown in FIG. 13 and the compromise delay mode is set.

FIG. 18 shows delayed images actually outputted when the field delay at the normal time is 1 to 3 (−1 to −3). In this case, the frame delay is one.

FIG. 19 shows delayed images actually outputted when the field delay at the normal time is 4 to 6 (−4 to −6). In this case, the frame delay is two.

FIG. 20 shows delayed images actually outputted when the frame delay is changed from one to two.

FIG. 21 shows delayed images actually outputted when the frame delay is changed from two to one.

Description is now made of the idea of field delay converting processing in a case where it is determined that an image signal is subjected to telecine conversion using the 2—2 pull-down system.

The following are a field delay conversion rule in this case:

(a) Such conversion is made that a frame delay in the current field is made as constant as possible.

(b) The number of fields assigned to one frame after the conversion shall be one to three in order to provide a smooth image even by only one eye.

(c) A field delay after the conversion (a field delay in the succeeding field) is so assigned that the frame delay is one when the field delay at the normal time is 1 to 2 (−1 to −2), the frame delay is two when the field delay at the normal time is 3 to 4 (−3 to −4), and the frame delay is three when the field delay at the normal time is 5 to 6 (−5 to −6).

(d) When the frame delay is so changed as to be increased, three fields are assigned to one frame. On the contrary, when the frame delay is so changed as to be decreased, one field is assigned to one frame.

(e) The field delay after the conversion is made as even as possible in order to select the image signal, which is not the output c of the interpolating circuit 12, out of the delayed image signals b and c shown in FIG. 1.

An image signal obtained by telecine conversion using the 2—2 pull-down system is indicated as shown in FIG. 22. Symbols A, B, C . . . indicate the types of frames, and subscripts 1, 2, 3, . . . indicate field numbers.

FIGS. 23 to 28 show delayed images actually outputted by the cinema mode detecting and controlling processing when the input image signal a is the image signal shown in FIG.

FIG. 23 shows delayed images actually outputted when the field delay at the normal time is 1 to 2 (−1 to −2). In this case, the frame delay is one. In this case, the delayed images actually outputted are the same, whether the delay mode is the complete delay mode or the compromise delay mode. In FIG. 23, an image corresponding to a numeral 0 in the upper column represents an image corresponding to the current field outputted as an image signal for one eye. In addition, images respectively corresponding to numerals 1 to 6 in the upper column represent images corresponding to field delays 1 to 6. An image put in parentheses represents a delayed image actually outputted.

FIG. 24 shows delayed images actually outputted when the field delay at the normal time is 3 to 4 (−3 to −4). In this case, the frame delay is two. In this case, the delayed images actually outputted is the same, whether the delay mode is the complete delay mode or the compromise delay mode.

FIG. 25 shows delayed images actually outputted when the field delay at the normal time is 5 to 6 (−5 to −6). In this case, the frame delay is three. In this case, the delayed images actually outputted are the same, whether the delay mode is the complete delay mode or the compromise delay mode.

FIG. 26 shows delayed images actually outputted when the frame delay is changed to 0, 1, 2 and 3 in this order in a case where the complete delay mode is set.

FIG. 27 shows delayed images actually outputted when the frame delay is changed to 0, 1, 2 and 3 in this order in a case where the compromise delay mode is set.

FIG. 28 shows delayed images actually outputted when the frame delay is changed to 3, 2, 1 and 0 in this order. In this case, the delayed images actually outputted are the same, whether the delay mode is the complete delay or the compromise delay mode.

Table 2 is a table for assignment of periodic patterns of peak hystereses of motion vectors in an image obtained by telecine conversion using the 2-3 pull-down system. Such a table for assignment is stored as a periodic pattern assignment table in the ROM 21.

TABLE 2

| periodic pattern | field delay (absolute value) | | | | | | |
|---|---|---|---|---|---|---|---|
| | 0 | 1 | 2 | 3 | 4 | 5 | 6 |
| 0 | 0 | 0 | 1 | 0 | 1 | 0 | 0 |
| 1 | 1 | 0 | 0 | 1 | 0 | 1 | 0 |
| 2 | 0 | 1 | 0 | 0 | 1 | 0 | 1 |
| 3 | 1 | 0 | 1 | 0 | 0 | 1 | 0 |
| 4 | 0 | 1 | 0 | 1 | 0 | 0 | 1 |

In Table 2, a field delay 0 indicates the current field, and field delays 1 to 6 respectively indicate fields corresponding to images which are delayed by 1 to 6 fields from an image corresponding to the current field.

Table 3 shows a periodic pattern and an optimum field delay corresponding to a field delay at the normal time (a normal field delay) used in field delay converting processing with respect to an image obtained by telecine conversion using the 2-3 pull-down system. Such a table is stored as an optimum field delay table in the ROM 21.

TABLE 3

| periodic pattern | normal field delay | | |
|---|---|---|---|
| | 0 | ±1~±3 | ±1~±34 |
| 0 | 0 | 3 (4) | 5 (6) |
| 1 | 0 | 2 | 4 |
| 2 | 0 | 2 | 5 (6) |
| 3 | 0 | 2 | 4 |
| 4 | 0 | 2 | 4 |

In the foregoing Table 3, a numeral put in parentheses represents an optimum field delay at the time of the compromise delay mode.

Table 4 shows the relationship between an optimum field delay and a frame delay which is used in field delay converting processing with respect to an image obtained by telecine conversion using the 2-3 pull-down system. Such a table is stored as a frame delay table in the ROM 21.

TABLE 4

| periodic pattern | optimum field delay (absolute value) | | | | | | | |
|---|---|---|---|---|---|---|---|---|
| | 0 | 1 | 2 | 3 | 4 | 5 | 6 | 7 |
| 0 | 0 | 0 | 0 | 1 | 1 | 2 | 2 | 2 |
| 1 | 0 | 1 | 1 | 1 | 2 | 2 | 3 | 3 |
| 2 | 0 | 0 | 1 | 1 | 1 | 2 | 2 | 3 |
| 3 | 0 | 1 | 1 | 2 | 2 | 2 | 3 | 3 |
| 4 | 0 | 0 | 1 | 1 | 2 | 2 | 2 | 3 |

Table 5 is a table for assignment of periodic patterns of peak hystereses of motion vectors in an image obtained by telecine conversion using the 2—2 pull-down system. Such a table for assignment is stored as a periodic pattern assignment table in the ROM 21.

TABLE 5

| periodic pattern | field delay (absolute value) | | | | | | |
|---|---|---|---|---|---|---|---|
| | 0 | 1 | 2 | 3 | 4 | 5 | 6 |
| 0 | 0 | 1 | 0 | 1 | 0 | 1 | 0 |
| 1 | 1 | 0 | 1 | 0 | 1 | 0 | 1 |

In Table 5, a field delay 0 indicates the current field, and field delays 1 to 6 respectively indicate fields corresponding to images which are delayed by 1 to 6 fields from an image corresponding to the current field.

Table 6 shows a periodic pattern and an optimum field delay corresponding to a normal field delay used in field delay converting processing with respect to an image obtained by telecine conversion using the 2—2 pull-down system. Such a table is stored as an optimum field delay table in the ROM 21.

TABLE 6

| periodic pattern | normal field delay | | | |
|---|---|---|---|---|
| | 0 | ±1~±2 | ±3~±4 | ±5~±6 |
| 0 | 0 | 2 | 4 | 6 |
| 1 | 0 | 2 | 4 | 6 |

Table 7 shows the relationship between an optimum field delay and a frame delay which is used in field delay converting processing with respect to an image obtained by telecine conversion using the 2—2 pull-down system. Such a table is stored as a frame delay table in the ROM 21.

TABLE 7

| periodic pattern | optimum field delay (absolute value) | | | | | | | |
|---|---|---|---|---|---|---|---|---|
| | 0 | 1 | 2 | 3 | 4 | 5 | 6 | 7 |
| 0 | 0 | 0 | 1 | 1 | 2 | 2 | 3 | 3 |
| 1 | 0 | 1 | 1 | 2 | 2 | 3 | 3 | 4 |

Description is now made of the cinema mode detecting and controlling processing on the basis of FIGS. 8 to 11. FIGS. 8 to 11 show an example in which an image signal obtained by telecine conversion using the 2-3 pull-down system and an image signal obtained by telecine conversion using the 2—2 pull-down system can be detected, and the field delay d3 determined in the step 6 shown in FIG. 2a is converted when the image signals are detected.

Figure 8A:
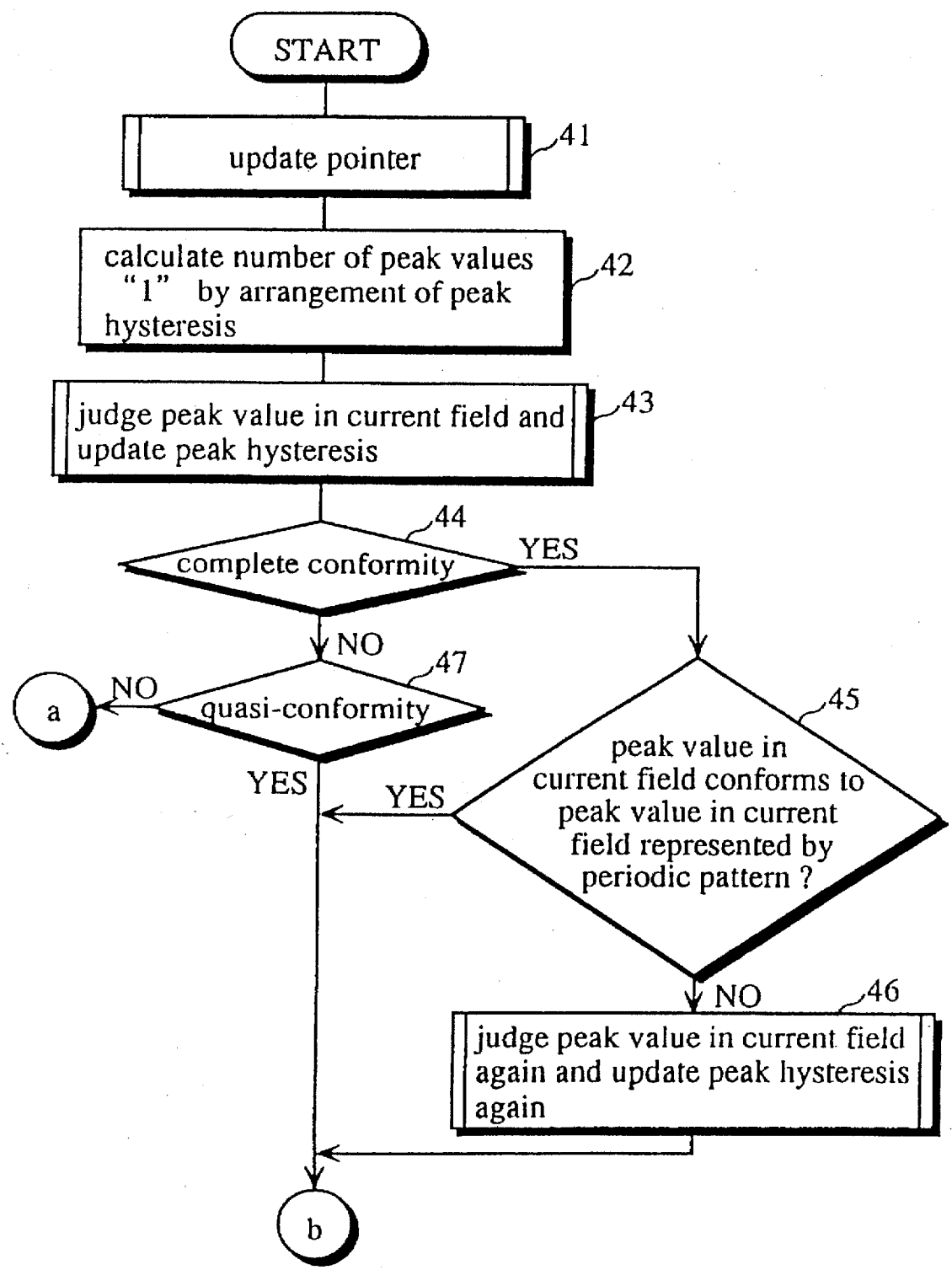
FIGS. 8a, 8b and 8c are flow charts showing the detailed procedure for cinema mode detecting and controlling processing in the step 11 shown in FIG. 2b.
Figure 8B:
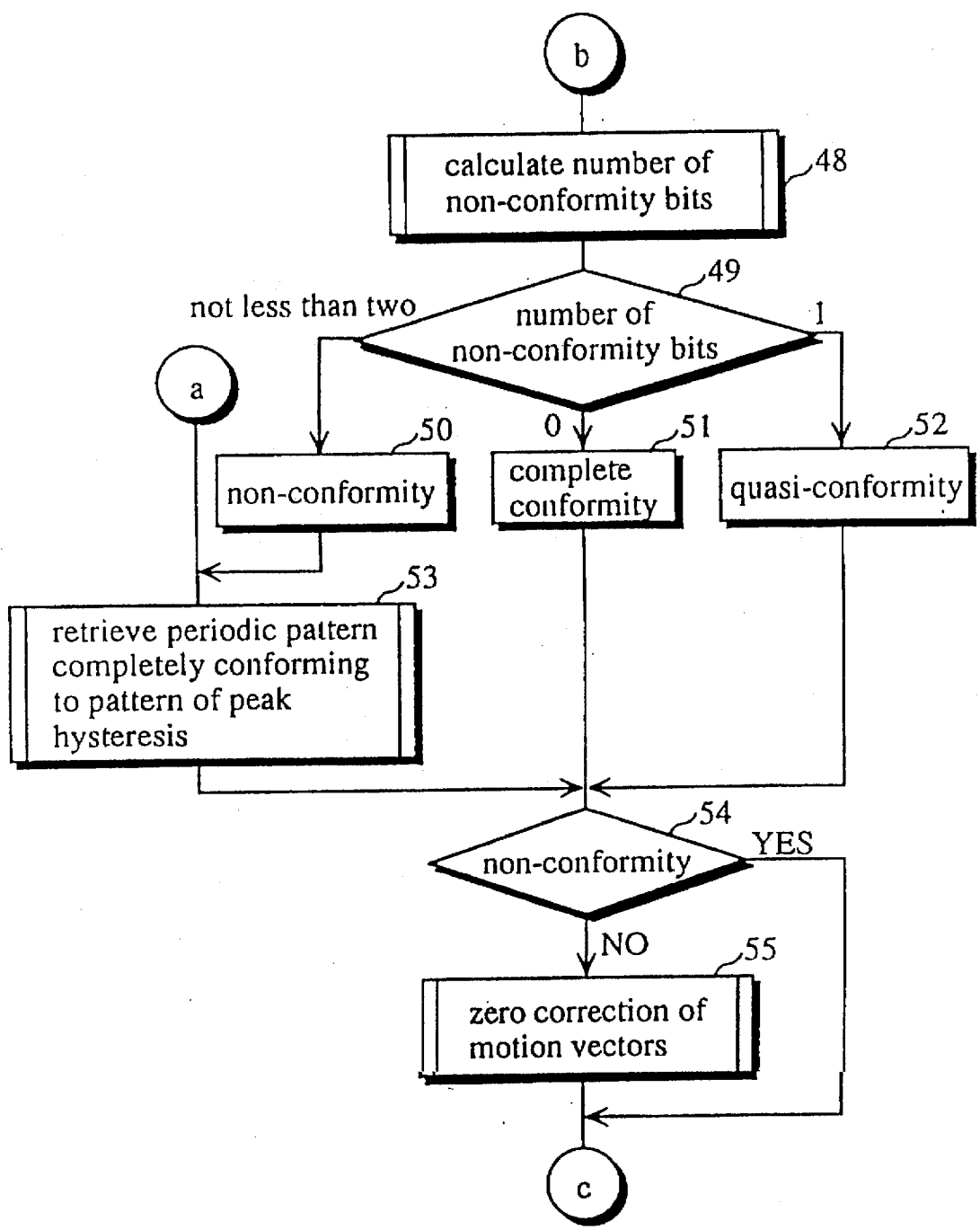
Figure 8C:
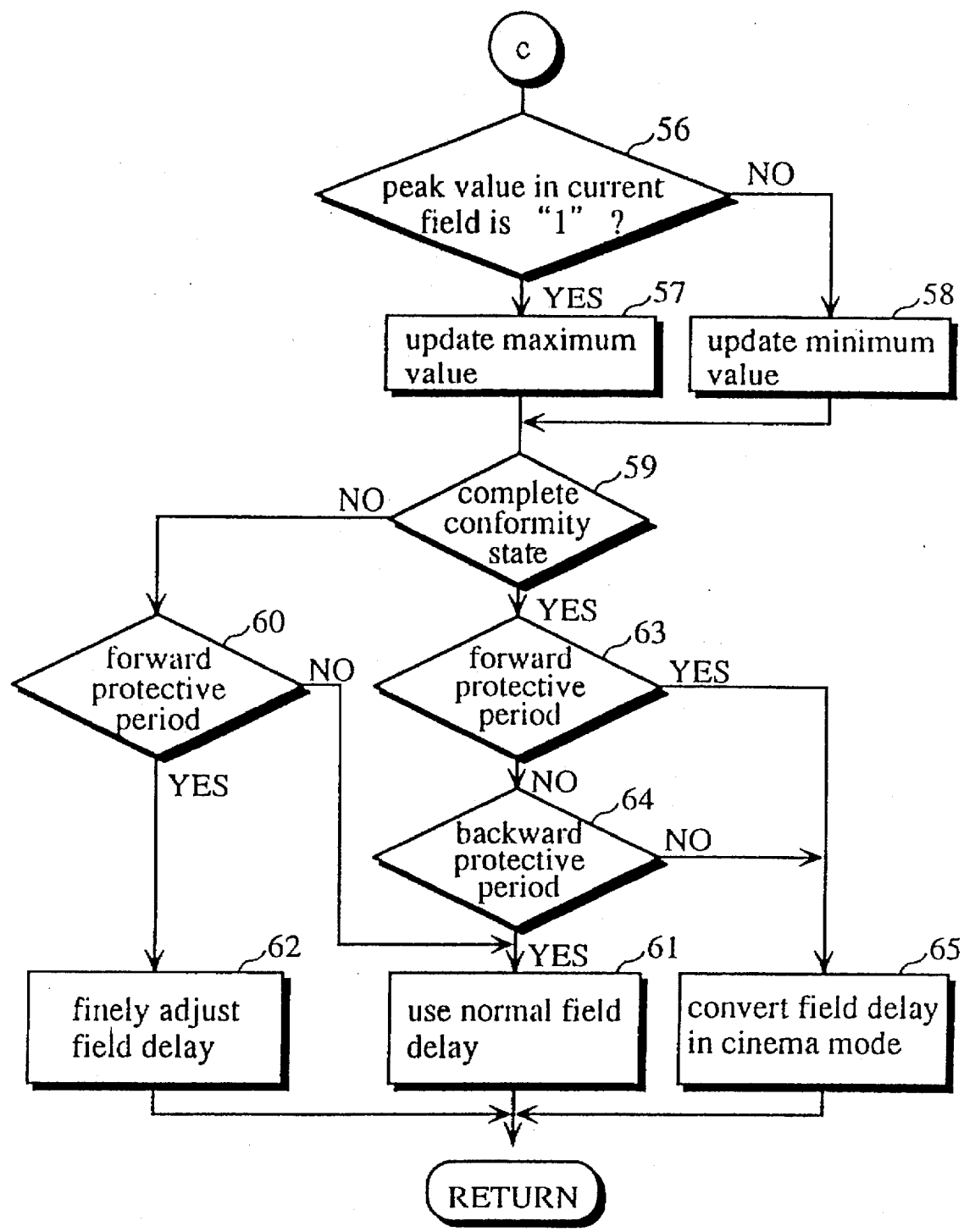

FIGS. 8a, 8b and 8c show the procedure for the entire cinema mode detecting and controlling processing.

A pointer indicating a periodic pattern in the current field is first updated (step 41).

The number of peak values "1" of motion vectors in a predetermined number of fields (for example, seven fields) preceding the current field is calculated by the arrangement of peak hystereses of the motion vectors (step 42).

The judgment of the peak value in the current field and the updating of peak hystereses are then performed (step 43). Specifically, if an accumulated correlation value in the current field is larger than one-half of the sum of an accumulated correlation value in the newest field including a motion vector whose peak value is "1" (hereinafter referred to as the maximum value of accumulated correlation values) and an accumulated correlation value in the newest field including a motion vector whose peak value is "0" (hereinafter referred to as the minimum value of accumulated correlation values), the peak value of the motion vector in the current field is set to "1". On the contrary, if the accumulated correlation value in the current field is not more than one-half of the sum of the maximum value of accumulated correlation values and the minimum value of accumulated correlation values, the peak value of the motion vector in the current field is set to "0".

The peak value of the motion vector in the current field is set to "1" when all peak hystereses in a predetermined number of fields preceding the current field are "0", while being set to "0" when all peak hystereses in a predetermined number of fields preceding the current field are "1."

When the peak value of the motion vector in the current field is determined, the peak hystereses in a predetermined number of fields preceding the current field are updated.

It is then judged whether or not the periodic pattern in the current field indicated by the pointer (a peak pattern) (see Table 2 or Table 5) and the pattern of peak hystereses in a predetermined number of fields preceding the current field excluding the peak value in the current field completely coincide with each other (step 44). If the patterns completely coincide with each other, it is judged whether or not the peak value in the current field conforms to a peak value in the current field which is represented by the periodic pattern specified in the foregoing step 41 (step 45).

When the peak value in the current field does not conform to the peak value in the current field which is represented by the periodic pattern specified in the foregoing step 41, the peak value in the current field is judged again and the peak hystereses are updated again (step 46). Specifically, when it is judged in the foregoing step 43 that the peak value in the current field is "0", the peak value in the current field is changed to "1" if the accumulated correlation value in the current field is larger than a value obtained by adding a predetermined value to the minimum value of accumulated correlation values in a predetermined number of fields preceding the current field. When it is judged in the foregoing step 43 that the peak value in the current field is "1", the peak value in the current field is changed to "0" if the accumulated correlation value in the current field is smaller than a value obtained by subtracting a predetermined value from the maximum value of accumulated correlation values in a predetermined number of fields preceding the current field. When the peak value in the current field is changed, the peak hystereses are updated again.

When it is judged in the foregoing step 44 that the periodic pattern and the pattern of peak hystereses do not completely coincide with each other, it is judged whether or not a quasi-conformity state occurs (step 47). The quasi-conformity state refers to a case where the periodic pattern in the current field indicated by the pointer (a peak pattern)

(see Table 2 or Table 5) and the pattern of peak hystereses in a predetermined number of fields preceding the current field excluding the peak value in the current field do not coincide with each other by one bit.

When it is judged in the step 47 that the quasi-conformity state occurs, the program proceeds to the step 48. When it is judged in the foregoing step 45 that the peak value in the current field conforms to the peak value in the current field which is represented by the periodic pattern specified in the foregoing step 41 and when the processing in the foregoing step 46 is performed, the program also proceeds to the step 48.

In the step 48, the number of non-conformity bits between the periodic pattern and the pattern of peak hystereses in the current field and a predetermined number of fields preceding the current field is calculated. It is judged that a complete conformity state occurs (step 51) if the number of non-conformity bits is zero, a quasi-conformity state occurs if it is one (step 52), and a non-conformity state occurs if it is not less than two (step 50).

When it is judged that the non-conformity state occurs (step 50) or it is judged in the foregoing step 47 that the quasi-conformity state does not occur, the program proceeds to the step 53. In the step 53, the pointer is updated, to retrieve a periodic pattern which completely coincide with the pattern of peak hystereses. In this case, it is further judged which of an image obtained by telecine conversion using the 2-3 pull-down system (a 2-3 pull-down mode) and an image obtained by telecine conversion using the 2—2 pull-down system (a 2—2 pull-down mode) is an inputted image signal, and the result of the judgment is stored.

The program proceeds to the step 54 after the steps 51, 52 and 53. In the step 54, it is judged whether or not a non-conformity state occurs. When the program proceeds to the step 54 from the step 51 or 52, the answer is in the negative in the step 54, after which the program proceeds to the step 55. When in the step 53, a periodic pattern which completely coincides with the pattern of peak hystereses is retrieved, the answer is in the negative in the step 54, after which the program proceeds to the step 55. On the other hand, when a periodic pattern which completely coincides with the pattern of peak hystereses is not retrieved, the answer is in the affirmative, after which the program proceeds to the step 56.

In the step 55, zero correction of motion vectors is made. Specifically, the number of motion vectors at not more than a predetermined level out of motion vectors in a predetermined number of fields preceding the current field is calculated. If the number of motion vectors at not more than a predetermined level is within a predetermined range, it is finally judged that a complete conformity state occurs; otherwise it would be judged that a non-conformity state occurs. The processing in the steps 54 and 55 may be omitted. Particularly in a system in which the detection precision of motion vectors is not too high, it is preferable that the processing in the steps 54 and 55 is omitted.

It is judged in the step 56 whether or not the peak value in the current field is "1". When the peak value in the current field is "1", the maximum value of accumulated correlation values is updated (step 57). On the other hand, when the peak value in the current field is "0", the minimum value of accumulated correlation values is updated (step 58).

It is then judged whether or not a complete conformity state occurs on the basis of the foregoing results of the state judgment (step 59). When the complete conformity state occurs, it is judged whether or not the present time point is in a forward protective period (step 63). When the present time point is in the forward protective period, field delay converting processing in a cinema mode is performed (step 65). When the present time point is not in the forward protective period, it is judged whether or not the present time point is in a backward protective period (step 64). When the present time point is not in the backward protective period, field delay converting processing in a cinema mode is performed (step 65).

When the present time point is in the backward protective period, the field delay determined by the normal field delay determining processing (the field delay d3 calculated in the step 6 shown in FIG. 2a) is taken as a field delay as it is (step 61).

Description is made of the forward protective period and the backward protective period. In the present embodiment, unless the complete conformity state is continuing a predetermined number of (N) times, the field delay converting processing in a cinema mode is not performed. A period corresponding to (N−1) times from the time when a state other than the complete conformity state is changed into the complete conformity state is the backward protective period.

When the field delay converting processing in a cinema mode is started once, the field delay found by the normal field delay determining processing (the field delay calculated in the step 6 shown in FIG. 2a) is not employed unless a state other than the complete conformity state is continuing a predetermined number of (M) times. A period corresponding to (M−1) times from the time when the complete conformity state is first changed into a state other than the complete conformity state after the field delay converting processing in a cinema mode is started once is the forward protective period.

When it is judged that the complete conformity state occurs in the forward protective period, the program proceeds to the field delay converting processing in a cinema mode. On the other hand, when it is judged that a state other than the complete conformity state occurs in the forward protective period, the field delay is finely adjusted, as described later.

When it is not judged in the foregoing step 59 that the complete conformity state occurs, it is judged whether or not the present time point is in the forward protective period (step 60). When the present time point is not in the forward protective period, the field delay determined by the normal field delay determining processing (the field delay d3 calculated in the step 6 shown in FIG. 2a) is taken as a field delay as it is (step 61).

When the present time point is in the forward protective period, the field delay is finely adjusted (step 62). Specifically, the field delay d3 is so determined that the field delay in the current field is brought near the field delay at the normal time (the field delay calculated in the step 6 shown in FIG. 2a) in units of a predetermined number of fields, for example, in units of four fields and one field at a time.

Figure 9A:
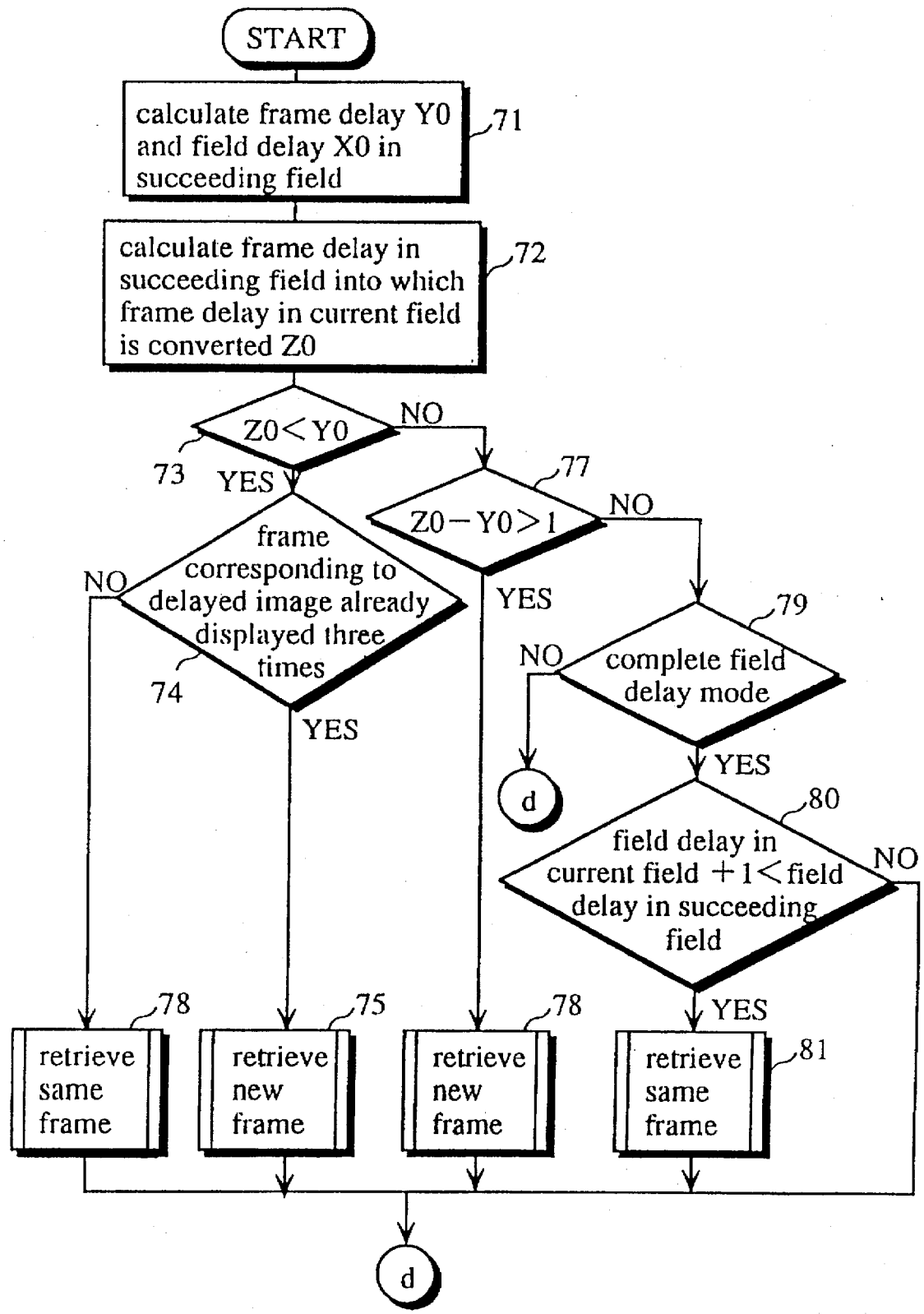
FIGS. 9a and 9b are flow charts showing the detailed procedure for field delay converting processing in the step 65 shown in FIG. 8c.
Figure 9B:
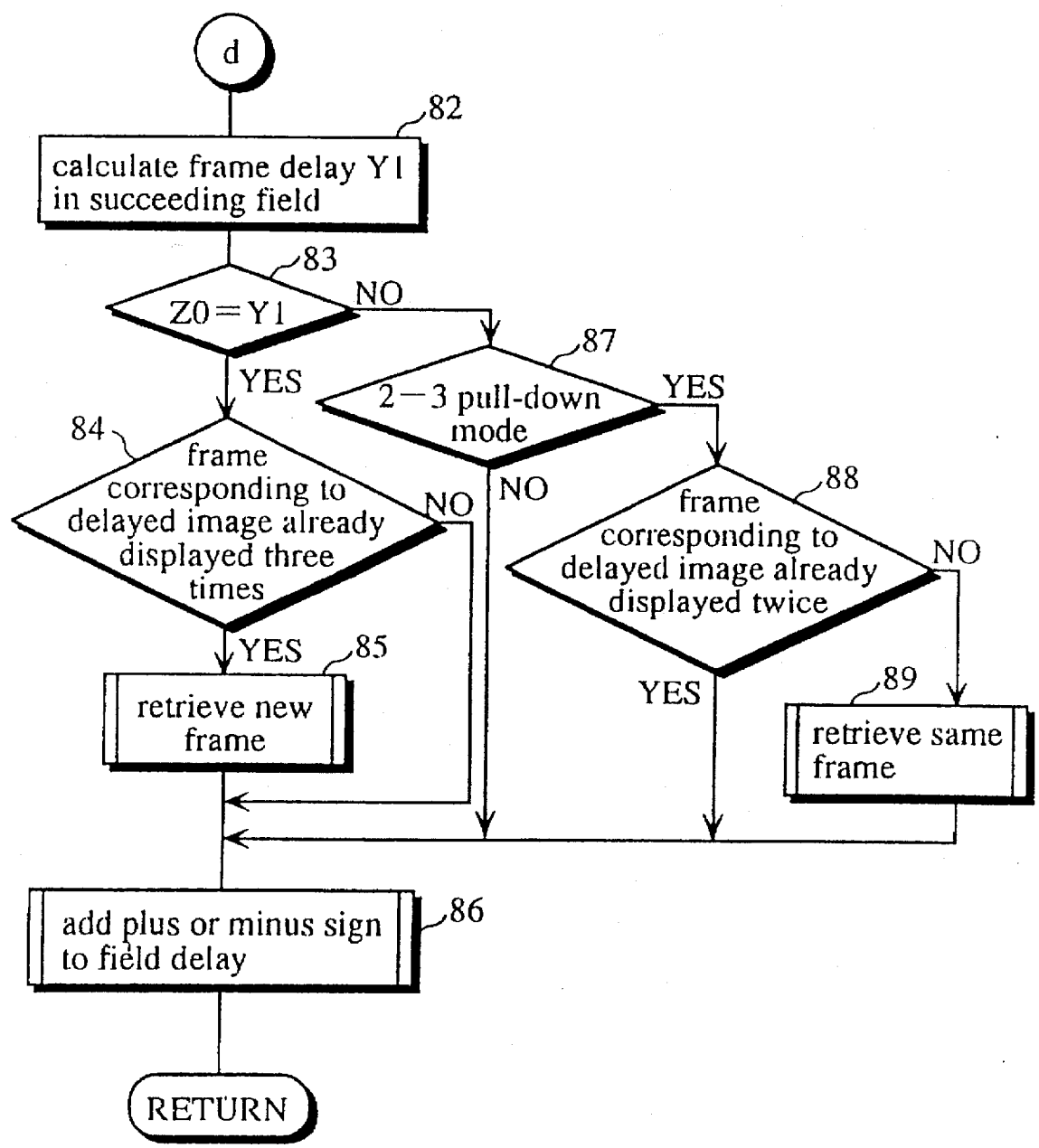

FIGS. 9a and 9b show the details of the field delay converting processing in a cinema mode in the step 65 shown in FIG. 8c.

An optimum field delay X0 and a frame delay Y0 in the succeeding field are first determined on the basis of a periodic pattern in the succeeding field and the normal field delay calculated in the step 6 (see FIG. 2a), the optimum field delay table (see Table 3 or Table 6) and the frame delay table (see Table 4 or Table 7) (step 71).

A frame delay Z0 in the succeeding field in a case where a frame corresponding to a delayed image outputted in the current field is displayed in the succeeding field (hereinafter referred to as a frame delay in the succeeding field into which a frame delay in the current field is converted) is then calculated (step 72).

It is then judged whether or not the frame delay Z0 is smaller than the frame delay Y0 (step 73). When the frame delay Z0 is smaller than the frame delay Y0, that is, a frame corresponding to the frame delay in the succeeding field which is calculated in the step 71 is older than a frame corresponding to the frame delay in the succeeding field into which a frame delay in the current field is converted which is calculated in the step 72, in other words, when the frame delay is changed in the direction in which it is increased, it is judged whether or not a frame corresponding to a delayed image outputted in the current field has already been displayed three times (step 74).

If the frame corresponding to the delayed image outputted in the current field has already been displayed three times, retrieving processing of a new frame is performed (step 75). Unless the frame corresponding to the delayed image outputted in the current field has already been displayed three times, retrieving processing of the same frame is performed in order to display the same frame three times (step 76). The details of the retrieving processing of a new frame and the retrieving processing of the same frame will be described later.

When it is judged in the foregoing step 73 that the frame delay Z0 is not less than the frame delay Y0, that is, a frame corresponding to the frame delay in the succeeding field which is calculated in the step 71 is equal to or newer than a frame corresponding to the frame delay in the succeeding field into which a frame delay in the current field is converted which is calculated in the step 72, in other words, when the frame delay is changed in the direction in which it is decreased, it is judged whether or not the difference (Z0–Y0) between the frame delay Z0 and the frame delay Y0 is larger than one (step 77).

When the difference (Z0–Y0) between the frame delay Z0 and the frame delay Y0 is more than one, the frame corresponding to the delayed image outputted in the succeeding field is spaced not less than two frames from the frame corresponding to the image outputted in the current field (the frames are skipped). In order to prevent this, retrieval processing of a new frame is performed (step 78).

When the difference (Z0–Y0) between the frame delay Z0 and the frame delay Y0 is not more than one (0 or 1), that is, when the frames are not skipped, it is judged which of the complete delay mode and the compromise delay mode is the delay mode (step 79). When the delay mode is the complete delay mode (step 79), it is judged whether or not a value obtained by adding one to the field delay in the current field is smaller than the optimum field delay X0 in the succeeding field which is calculated in the step 71 in order to judge whether or not the field return is made (step 80).

When the value obtained by adding one to the field delay in the current field is smaller than the optimum field delay X0 in the succeeding field, the field return is made. In order to prevent this, retrieving processing of the same frame is performed (step 81).

On the other hand, when the value obtained by adding one to the field delay in the current field is not less than the optimum field delay X0 in the succeeding field, no field return is made, whereby the program proceeds to the step 82.

When the difference (Z0–Y0) between the frame delay Z0 and the frame delay Y0 is not more than one in the foregoing step 77, and the delay mode is the compromise delay mode (step 79), the presence or absence of the field return need not be considered. Therefore, the program proceeds to the step 82 without performing the processing in the steps 80 and 81.

Even after the processing in the foregoing steps 75, 76 and 78 is terminated, the program proceeds to the step 82. When the program proceeds to the step 82 from the foregoing step 75, 76, 78 or 81, a frame delay Y1 in the succeeding field is calculated on the basis of an optimum field delay X1 in the succeeding field which is found by the retrieving processing in the steps. The periodic pattern in the current field and the frame delay table (see Table 4 or Table 7) are used to calculate the frame delay Y1 in the succeeding field.

On the other hand, when the program proceeds to the step 82 from the step 79 or 80, the frame delay Y1 (Y1=Y0) in the succeeding field is calculated on the basis of the optimum field delay X0 in the succeeding field which is found in the step 71.

It is then judged whether or not the frame delay Z0 is equal to the frame delay Y1 (Z0=Y1), that is, whether or not the frame corresponding to the delayed image outputted in the current field and the frame corresponding to the delayed image outputted in the succeeding field are the same (step 83). When the frame delay Z0 is equal to the frame delay Y1, it is judged whether or not the frame corresponding to the delayed image outputted in the current field is displayed three times in order that the frame corresponding to the delayed image outputted in the current field is not displayed more than three times (step 84).

When the frame corresponding to the delayed image outputted in the current field is displayed three times, retrieving processing of a new frame is performed in order that the frame corresponding to the delayed image outputted in the current field is not displayed more than three times (step 85). The plus or minus sign is added to the field delay (step 86). The program then proceeds to the step 12 shown in FIG. 2b.

When it is judged in the foregoing step 83 that the frame delay Z0 is not equal to the frame delay Y1, it is judged which of the 2–3 pull-down mode and the 2-pull-down mode is used (step 87).

When the 2–3 pull-down mode is used, it is judged whether or not the frame corresponding to the delayed image outputted in the current field has already been displayed twice in order to display the same frame a minimum of twice (step 88). Unless the frame corresponding to the delayed image outputted in the current field has already been displayed twice, retrieving processing of the same frame is performed in order to display the same frame a minimum of twice (step 89).

When it is judged in the foregoing step 88 that the frame corresponding to the delayed image outputted in the current field has already been displayed twice, the program proceeds to the step 86. In the step 86, the plus or minus sign is added to the field delay. The program then proceeds to the step 12 shown in FIG. 2b.

When it is judged in the foregoing step 87 that the 2–3 pull-down mode is not used, or since there is no such restriction that the same frame is displayed a minimum of twice, the program proceeds to the step 86 without performing the processing in the steps 88 and 89. In the step 86, the plus or minus sign is added to the field delay. The program then proceeds to the step 12 shown in FIG. 2b.

Figure 10:
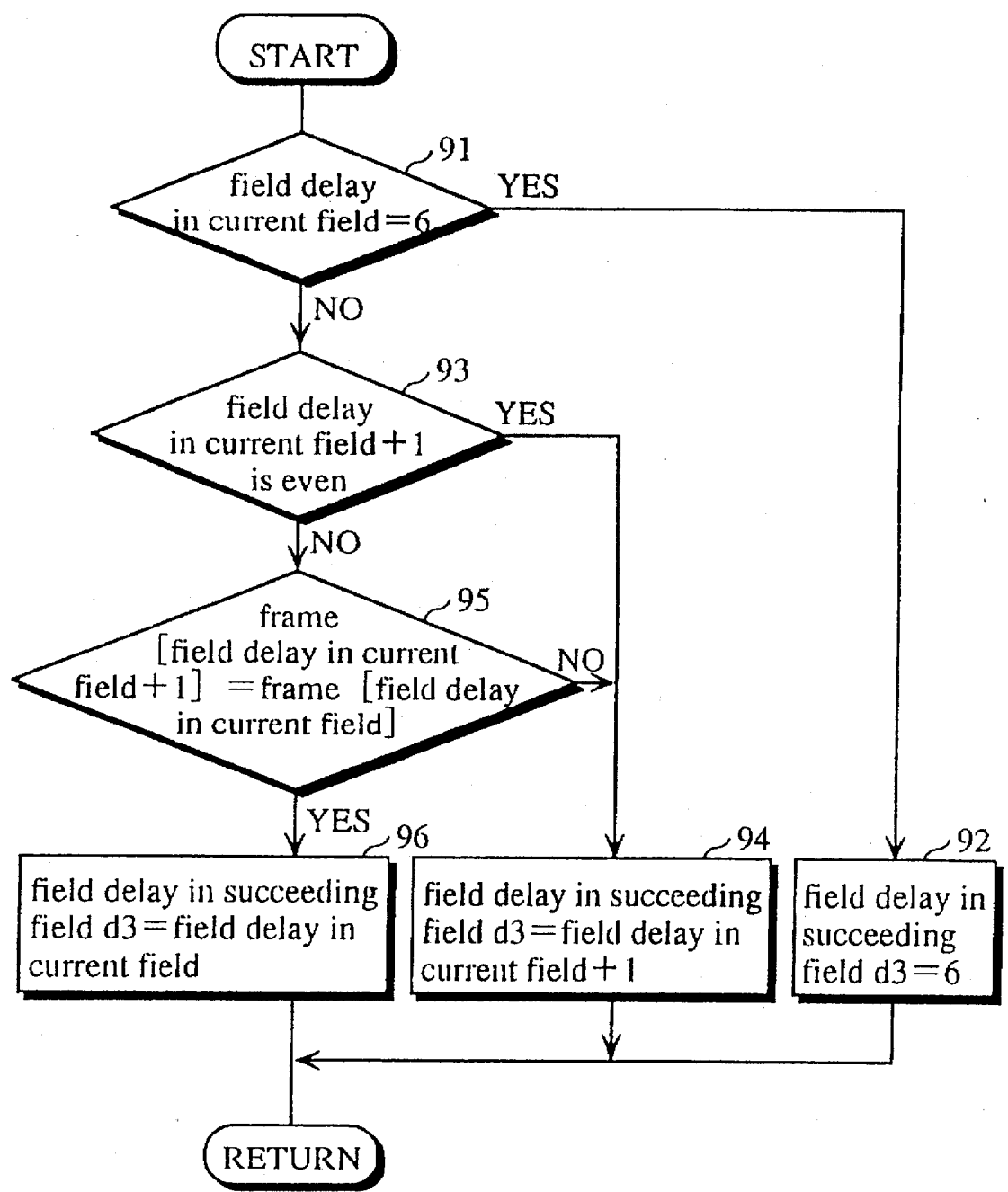
FIG. 10 is a flow chart showing the detailed procedure for retrieval processing of the same frame in the steps 76, 81 and 89 shown in FIGS. 9a and 9b.

FIG. 10 shows the details of the retrieving processing of the same frame in the steps 76, 81 and 89 shown in FIGS. 9a and 9b.

It is judged whether or not the field delay in the current field is the maximum value "6" (step 91). When the field delay in the current field is the maximum value "6", the field delay in the succeeding field (the set field delay d3) is set to six (step 92).

When the field delay in the current field is not the maximum value "6", that is, is not more than five, it is judged whether or not a value obtained by adding one to the field delay in the current field, that is, a field delay in the succeeding field into which a field delay in the current field is converted is even (step 93).

When the value obtained by adding one to the field delay in the current field is even, the field delay in the succeeding field (the set field delay d3) is set to the value obtained by adding one to the field delay in the current field so that the image signal h which is not interpolated by the interpolating circuit 12 is selected as a delayed image signal outputted in the succeeding field (step 94).

When the value obtained by adding one to the field delay in the current field is odd, it is judged whether or not a frame corresponding to the value obtained by adding one to the field delay in the current field (a frame [the field delay in the current field plus one]) is the same as the frame corresponding to the delayed image outputted in the current field (the frame [the field delay in the current field]) (step 95).

When both the frames are the same, the field delay in the succeeding field (the set field delay d3) is set to the field delay in the current field (step 96). As a result, in the succeeding field, the image signal which is not interpolated by the interpolating circuit 12 is selected, and the same frame as the frame corresponding to the delayed image outputted in the current field is outputted.

When both the frames differ in the step 95, the field delay in the succeeding field (the set field delay d3) is set to the value obtained by adding one to the field delay in the current field in order to obtain the same frame (step 94). In this case, the image signal c which is interpolated by the interpolating circuit 12 is selected in the succeeding field.

Figure 11:
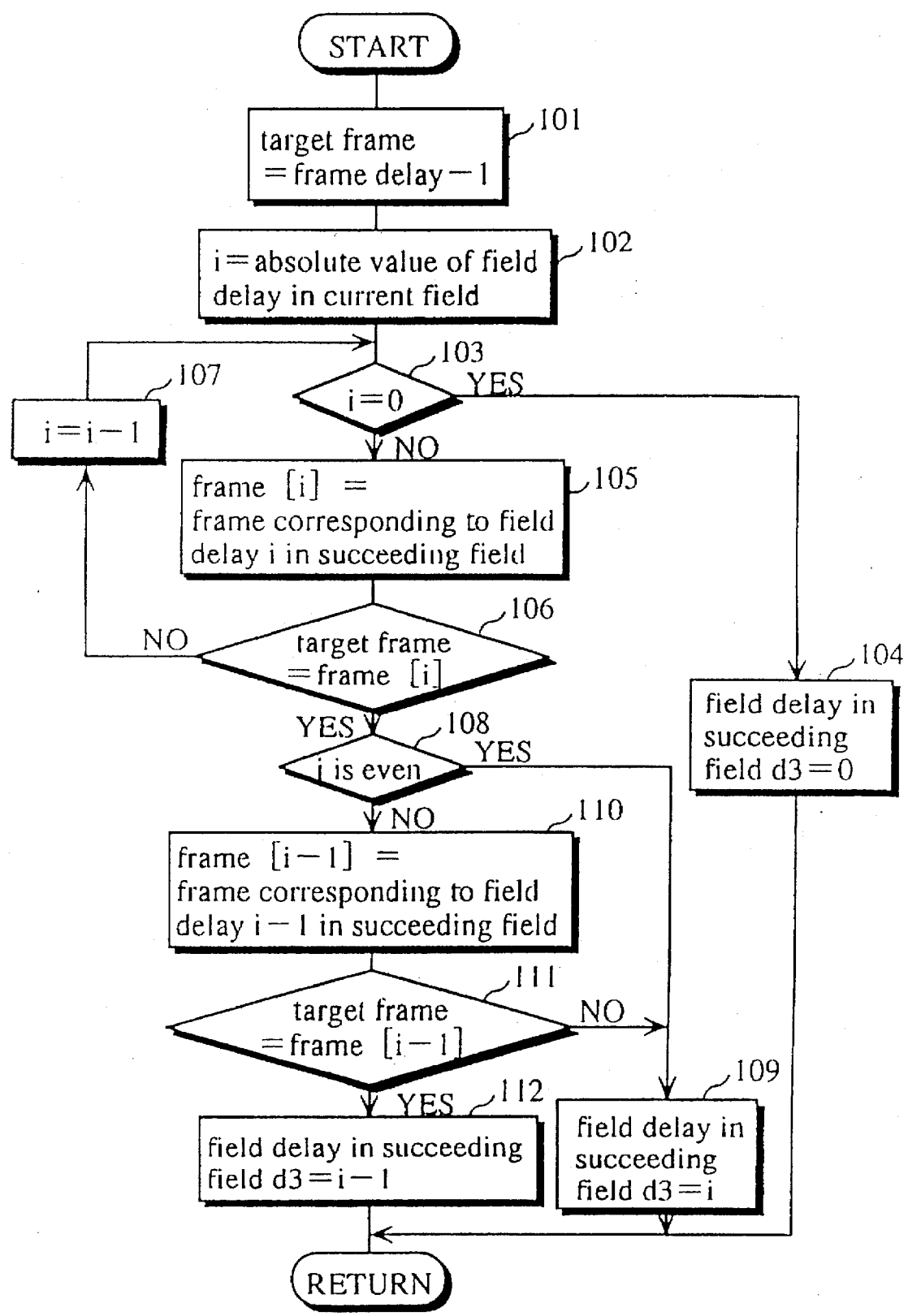
FIG. 11 is a flow chart showing the detailed procedure for retrieval processing of a new frame in the steps 75, 78 and 85 shown in FIGS. 9a and 9b.

FIG. 11 shows the details of the retrieving processing of a new frame in the steps 75, 78 and 85 shown in FIGS. 9a and 9b.

A target frame delay in the succeeding field is set to a frame delay which is smaller than the frame delay in the current field by one frame (step 101). That is, a frame which is newer than the frame corresponding to the delayed image outputted in the current field by one frame is taken as a target frame.

The absolute value of the field delay in the current field is then taken as i (step 102).

It is then judged whether or not i is zero (step 103). When i is zero, that is, when the field delay in the current field is zero, the field delay in the succeeding field (the set field delay d3) is set to zero (step 104).

When i is not zero, a frame corresponding to a field delay i in the succeeding field is taken as a frame [i] (step 105).

It is then judged whether or not the target frame set in the step 101 is the same as the frame [i] (step 106).

When the target frame is not the same as the frame [i], i is changed into (i−1) (step 107). The program is then returned to the step 103. If i after the change is zero, the program proceeds to the step 104. In the step 104, the field delay in the succeeding field (the set field delay d3) is set to zero.

Unless i after the change is zero, the program proceeds to the step 105. In the step 105, the frame corresponding to the field delay i in the succeeding field is taken as the frame [i]. It is judged whether or not the target frame set in the step 101 is the same as the frame [i] (step 106).

Specifically, in a loop comprising the steps 103, 105, 106 and 107, the same frame as the target frame is retrieved in a field between a field corresponding to a delayed image outputted in the current field and a field corresponding to a main image currently outputted (a field corresponding to an input image signal).

When it is judged in the step 106 that the target frame is the same as the frame [i], it is judged whether or not i is even (step 108). When i is even, the image signal b which is not interpolated by the interpolating circuit 12 is selected even if the field delay in the succeeding field is set to i, whereby the field delay in the succeeding field (the set field delay d3) is set to i (step 109).

When it is judged in the step 108 that i is odd, a frame corresponding to a field delay (i−1) in the succeeding field is taken as a frame [i−1] (step 110). It is judged whether or not the target frame is the same as the frame [i−1] (step 111).

When the target frame is the same as the frame [i−1], the target frame can be selected even if the field delay in the succeeding field is set to (i−1) in order to output the image signal b which is not interpolated by the interpolating circuit 12 in the succeeding field, whereby the field delay in the succeeding field (the set field delay d3) is set to (i−1) (step 112). When the target frame is not the same as the frame [i−1], the field delay in the succeeding field (the set field delay d3) is set to i (step 109). In this case, the image signal c which is interpolated by the interpolating circuit 12 is outputted in the succeeding field.

Figure 29:
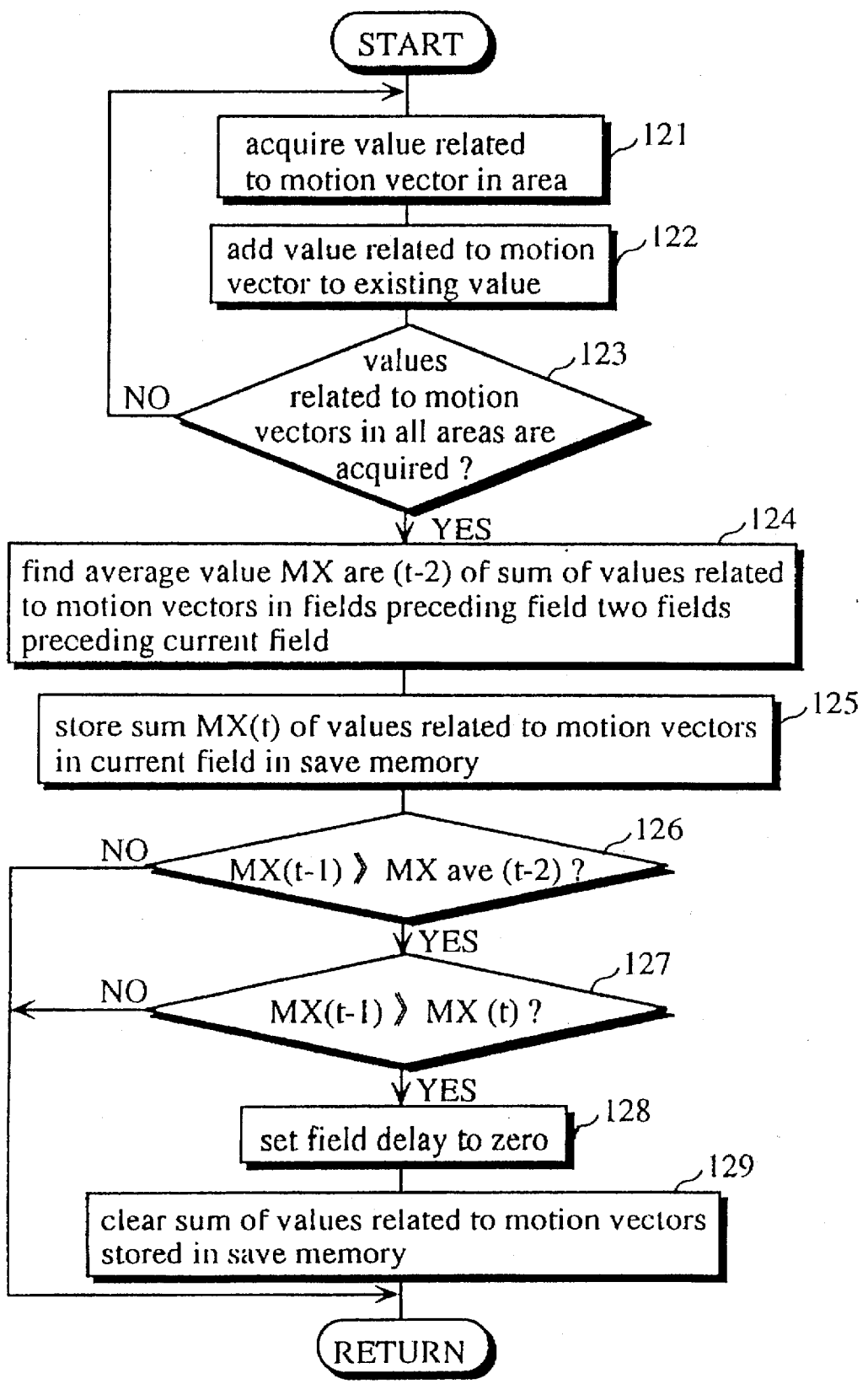
FIG. 29 is a flow chart showing the detailed procedure for scene change detecting and controlling processing in the step 12 shown in FIG. 2b.

FIG. 29 shows the details of the scene change detecting and controlling processing in the step 12 shown in FIG. 2b.

Consider a case where a 3D image is produced from a 2D image by a frame delay system. When a scene currently reflected is changed to an entirely different scene, a new scene is reflected on a left type image, while the preceding scene is reflected on a right eye image. Therefore, a viewer feels uncomfortable at a change point of the scenes.

The scene change detecting and controlling processing is processing for solving the above described problem by detecting a scene change and setting all field delays (d1, d2, d3 and Pd) and all field delay hysteresis data to zero when the scene change is detected.

The magnitude of a motion vector in the horizontal direction (a value related to a motion vector) in the current field in predetermined one area a out of a plurality of motion vector detecting areas a, b, c . . . is first acquired (step 121). The value related to the motion vector acquired in the step 121 is then added to the existing value (step 122). The initial value of the existing value is zero.

The program is then returned to the step 121. In the step 121, the magnitude of a motion vector in the horizontal direction (a value related to a motion vector) in the current field in the other motion vector detecting area b is acquired (step 121). The acquired value related to the motion vector is added to the existing value, that is, the value related to the motion vector in the motion vector detecting area a (step 122). The sum of values related to motion vectors in the current field in all the motion vector detecting areas is thus calculated (steps 121, 122, 123).

When the current field is taken as the t-th field (t is a natural number), and the sum of the values related to the motion vectors in the current field is taken as MX(t), MX(t) is represented by the following equation (4):

$$MX(t) = \sum_{i=1}^{Nx} \sum_{j=1}^{Ny} |\overrightarrow{Mij(t)} \cdot \overrightarrow{ex}| \quad (4)$$

Nx: the number of motion vector detecting areas in the transverse direction of a screen Ny: the number of motion vector detecting areas in the longitudinal direction of the screen $\overrightarrow{Mij(t)}$: a motion vector in the t-th field $\overrightarrow{ex}$: a unit vector in the transverse direction When the sum of the values related to the motion vectors in the current field in all the motion vector detecting areas is calculated (YES in the step 123), an average value of the sum of values related to motion vectors in fields preceding a field which is two fields preceding the current field is found (step 124).

Specifically, an average value MXave(t−2) of the sum MX(t−3) of values related to motion vectors in an image corresponding to a field which is three fields preceding the current field and the sum MX(t−2) of values related to motion vectors in an image corresponding to a field which is two fields preceding the current field is taken as an average value MXave(t−2) of the sum of values related to motion vectors in fields preceding a field which is two fields preceding the current field. MXave(t−2) is found on the basis of the following equation (5):

$$MXave(t) = \frac{1}{S} \cdot \sum_{k=1}^{S} MX(t+1-k) \tag{5}$$

S: the number of fields for finding an average value
MX(t+1−k) : the sum of motion vectors in the (t+1−k) field In this example, S=2. Although in the present embodiment, the average value MXave(t−2) of the sum MX(t−3) of values related to motion vectors in an image corresponding to a field which is three fields preceding the current field and the sum MX(t−2) of values related to motion vectors in an image corresponding to a field which is two fields preceding the current field is taken as the average value of the sum of values related to motion vectors in fields preceding a field which is two fields preceding the current field, an average value of the sum of values related to motion vectors in not less than two fields, for example, eight fields (S=8) from a field which is two fields preceding the current field to a field which is nine fields preceding the current field may be taken as the average value of the sum of values related to motion vectors in fields preceding a field which is two fields preceding the current field.

The sum MX(t) of values related to motion vectors in the current field which is obtained in the foregoing steps 121, 122 and 123 is then stored in a save memory of the RAM 22 (step 125). The sum of values related to motion vectors for each field with respect to images corresponding to fields preceding a field which is several fields preceding the current field is stored in the save memory.

It is then judged whether or not the sum MX(t−1) of values related to motion vectors in a field which is one field preceding the current field which is stored in the save memory is larger than the average value MXave(t−2) obtained in the step 124 by not less than a predetermined value (for example, 40 pixels) (step 126). When the sum MX(t−1) is not larger than the average value MXave(t−2) by not less than the predetermined value, the processing is terminated.

When the sum MX(t−1) is larger than the average value MXave(t−2) by not less than a predetermined value, it is judged whether or not the sum MX(t−1) of the values related to the motion vectors in the field which is one field preceding the current field which is stored in the save memory is larger than the sum MX(t) of the values related to the motion vectors in the current field which is stored in the save memory by not less than a predetermined value (for example, 40 pixels) (step 127). When the sum MX(t−1) is not larger than the sum MX(t) by not less than the predetermined value, the processing is terminated.

When the sum MX(t−1) is larger than the sum MX(t) by not less than the predetermined value, it is judged that a change point of scenes occurs between an image corresponding to a field which is two fields preceding the current field and an image corresponding to a field which is one field preceding the current field, after which the program proceeds to the step 128.

Specifically, when the following equation (6) satisfying the conditions of MX(t−1)>>MXave(t−2) and MX(t−1)>>MX(t) holds, it is judged that the value related to the motion vector is rapidly increased, and it is judged that a scene change occurs between the (t−2)-th field and the (t−1)-th field:

$$MX(t-1)>>MXave(t-2) \cap MX(t-1)>>MX(t) \tag{6}$$

In the step 128, the field delay (the set field delay d3) is so set to zero that both a left eye image signal and a right eye image signal which are outputted from the image switching circuit 13 become 2D image signals inputted to the input terminal 1. Consequently, at a change point of scenes, the left and right eye image signals respectively outputted from the output terminals 2 and 3 become the same image signal, and left and right images reflected on the monitor become the same image, whereby the viewer does not feel uncomfortable.

Thereafter, all the sums of values related to motion vectors in the respective fields which are stored in the save memory are cleared (step 129).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of converting two-dimensional images into three-dimensional images by producing from a two-dimensional image signal a main image signal and a sub-image signal delayed from the main image signal, comprising:

a first step of finding a temporary field delay indicating the number of fields from a field corresponding to the main image signal to a field corresponding to the sub-image signal on the basis of data related to the movement in the current field of the main image signal;

a second step of finding a target field delay on the basis of the temporary field delay found in the first step; and a third step of finding a true field delay used in the succeeding field on the basis of the target field delay found in the second step and a true field delay used in the current field.

2. The method according to claim 1, wherein said first step comprises the step of, finding the temporary field delay on the basis of a table previously storing the relationship of a temporary field delay to data related to the movement of an image.

3. The method according to claim 1, wherein said first step comprises the step of, finding the temporary field delay on the basis of a relational expression for finding a temporary field delay from data related to the movement of an image.

4. The method according to claim 1, wherein said second step comprises the step of, taking the temporary field delay found in said first step as the target field delay.

5. The method according to claim 1, wherein said second step comprises the step of, finding the target field delay on the basis of the temporary field delay found in said first step and past hysteresis data.

6. The method according to claim 5, wherein said second step comprises the steps of finding an average value of temporary field delays in a predetermined number of fields preceding the current field including the temporary field delay found in said first step, and taking the average value as the target field delay.

7. The method according to claim 5, wherein said second step comprising the steps of, finding an average value of temporary field delays in a predetermined number of fields preceding the current field including the temporary field delay found in said first step, finding one or a plurality of average values of temporary field delays in a predetermined number of fields preceding a field which is one or more fields preceding the current field, and finding the target field delay on the basis of patterns of a combination of the found average values.

8. The method according to claim 5, wherein said second step comprises the steps of, finding an average value of temporary field delays in a predetermined number of fields preceding the current field, finding one or a plurality of average values of temporary field delays in a predetermined number of fields preceding a field which is one or more fields preceding the current field, and finding the target field delay on the basis of the respective average values.

9. The method according to claim 5, wherein said second step comprises the steps of, finding an average value of temporary field delays in a predetermined number of fields preceding the current field, finding one or a plurality of average values of temporary field delays in a predetermined number of fields preceding a field which is one or more fields preceding the current field, selecting an optimum average value in the current field from the average values, and finding the target field delay on the basis of patterns of a combination of the optimum average value selected in the current field and one or a plurality of optimum average values selected in fields preceding the current field.

10. The method according to claim 1, wherein said third step comprises the steps of, making the true field delay used in the succeeding field equal to the true field delay used in the current field in a case where the target field delay found in the second step and the true field delay used in the current field coincide with each other, or in a case where the target field delay found in the second step and the true field delay used in the current field do not coincide with each other and the true field delay used in the current field is not continuing for a predetermined number of fields, and setting the true field delay used in the succeeding field to a value closer to the target field delay by a predetermined value than the true field delay used in the current field in a case where the target field delay found in the second step and the true field delay used in the current field do not coincide with each other and the true field delay used in the current field is continuing for a predetermined number of fields.

11. The method according to claim 1, wherein said third step comprises the step of, so determining the true field delay used in the succeeding field that the true field delay used in the current field quickly approaches the target field delay in a case where the plus or minus sign of the target field delay found in the second step differs from the plus or minus sign of the true field delay used in the current field, or in a case where the plus or minus sign of the target field delay found in the second step is the same as the plus or minus sign of the true field delay used in the current field and the absolute value of the target field delay is smaller than the absolute value of the true field delay used in the current field, and so determining the true field delay used in the succeeding field that the true field delay used in the current field slowly approaches the target field delay in a case where the plus or minus sign of the target field delay found in the second step is the same as the plus or minus sign of the true field delay used in the current field and the absolute value of the target field delay is larger than the absolute value of the true field delay used in the current field.

12. The method according to claim 1, wherein said third step comprises a fourth step of judging whether or not the target field delay found in the second step and the true field delay used in the current field coincide with each other, a fifth step for judging whether or not the plus or minus sign of the target field delay found in the second step and the plus or minus sign of the true field delay used in the current field coincide with each other when it is judged in the fourth step that the target field delay found in the second step and the true field delay used in the current field do not coincide with each other, a sixth step of judging whether or not the absolute value of the target field delay found in the second step is larger than the absolute value of the true field delay used in the current field when it is judged in the fifth step that the plus or minus sign of the target field delay found in the second step and the plus or minus sign of the true field delay used in the current field coincide with each other, a seventh step of judging whether or not the true field delay used in the current field is continuing for a first predetermined number of fields when it is judged in the sixth step that the absolute value of the target field delay found in the second step is larger than the absolute value of the true field delay used in the current field, an eighth step of judging whether or not the true field delay used in the current field is continuing for a second predetermined number of fields smaller than the first predetermined number of fields when it is judged in the fifth step that the plus or minus sign of the target field delay found in the second step and the plus or minus sign of the true field delay used in the current field do not coincide with each other, a ninth step of judging whether or not the true field delay used in the current field is continuing for a third predetermined number of fields smaller than the first predetermined number of fields when it is judged in the sixth step that the absolute value of the target field delay found in the second step is smaller than the absolute value of the true field delay used in the current field, a tenth step of making the true field delay used in the succeeding field equal to the true field delay used in the current field when it is judged in the fourth step that the target field delay found in the second step and the true field delay used in the current field coincide with each other, when it is judged in the seventh step that the true field delay used in the current field is not continuing for a first predetermined number of fields, when it is judged in the eighth step that the true field delay used in the current field is not continuing for a second predetermined number of fields, or when it is judged in the ninth step that the true field delay used in the current field is not continuing for a third predetermined number of fields, and an eleventh step of setting the true field delay used in the succeeding field to a value closer to the target field delay by a predetermined value than the true field delay used in the current field when it is judged in the seventh step that the true field delay used in the current field is continuing for a first predetermined number of fields, when it is judged in the eighth step that the true field delay used in the current field is continuing for a second predetermined number of fields, or when it is judged in the ninth step that the true field delay used in the current field is continuing for a third predetermined number of fields.

13. A method of converting two-dimensional images into three-dimensional images by producing from a two-dimensional image signal a main image signal and a sub-image signal delayed from the main image signal and shifting the phase of the main image signal and/or the sub-image signal, comprising the steps of:

finding a field delay from the main image signal to the sub-image signal in the succeeding field on the basis of data related to the movement in the current field of the main image signal; and so determining the amount and the direction of phase shift of the main image signal and/or sub-image signal that an amount of the change between a field delay in the current field and the field delay in the succeeding field is substantially reduced.

14. A method of converting two-dimensional images into three-dimensional images by producing from a two-dimensional image signal a main image signal and a sub-image signal delayed from the main image signal, comprising the steps of:

previously storing a plurality of types of tables representing the relationship between the speed of the movement of an image and a field delay, and providing inputting means for designating a predetermined table out of the plurality of types of tables, calculating the speed of the movement of the main image signal for each field, finding a field delay on the basis of the table designated by the inputting means and the speed of the movement in the current field of the main image signal, and determining a field delay from the main image signal to the sub-image signal in the succeeding field on the basis of the found field delay.

15. A method of converting two-dimensional images into three-dimensional images by producing from a two-dimensional image signal a main image signal and a sub-image signal delayed from the main image signal and subjecting the main image signal and the sub-image signal to phase shift in the horizontal direction, comprising the steps of:

previously storing a plurality of types of tables representing the relationship between the speed of the movement of an image and a field delay and an amount of phase shift predetermined for each table, and providing single inputting means for designating a predetermined table out of the plurality of types of tables and at the same time, designating an amount of phase shift corresponding thereto;

calculating the speed of the movement of the main image signal for each field;

finding a field delay on the basis of the table designated by the inputting means and the speed of the movement in the current field of the main image signal;

determining a field delay from the main image signal to the sub-image signal in the succeeding field on the basis of the found field delay; and subjecting the main image signal and the sub-image signal delayed by said determined field delay from the main image signal to phase shift in the succeeding field depending on the amount of phase shift designated by the inputting means.

16. A method of converting two-dimensional images into three-dimensional images by producing from a two-dimensional image signal a main image signal and a sub-image signal delayed from the main image signal, comprising the steps of:

previously producing a relational expression for finding a field delay on the basis of three-dimensional effect adjusting data and the speed of the movement of an image, and providing inputting means for inputting the three-dimensional effect adjusting data;

calculating the speed of the movement of the main image signal for each field;

finding a field delay on the basis of the adjusting data inputted by the inputting means, the speed of the movement in the current field of the main image signal, and the relational expression previously produced; and determining a field delay from the main image signal to the sub-image signal in the succeeding field on the basis of the found field delay.

17. A method of converting two-dimensional images into three-dimensional images by producing from a two-dimensional image signal a main image signal and a sub-image signal delayed from the main image signal, comprising the steps of:

previously storing a table representing the relationship between the speed of the movement of an image and a field delay, and providing inputting means for inputting field delay scale factor data;

calculating the speed of the movement of the main image signal for each field;

finding a field delay on the basis of the speed of the movement in the current field of the main image signal and the table;

multiplying the found field delay by the field delay scale factor data inputted by the inputting means; and determining a field delay from the main image signal to the sub-image signal in the succeeding field on the basis of a value obtained by the multiplication.

* * * * *